United States Patent
Cho et al.

(10) Patent No.: US 10,922,530 B2
(45) Date of Patent: Feb. 16, 2021

(54) DISPLAY DEVICE AND OPERATING METHOD THEREOF WITH ADJUSTMENTS RELATED TO AN IMAGE DISPLAY ACCORDING TO BENDING MOTION OF THE DISPLAY DEVICE

(71) Applicant: SAMSUNG ELECTRONICS CO., LTD., Suwon-si (KR)

(72) Inventors: Shi-yun Cho, Anyang-si (KR); So-young Kim, Suwon-si (KR); Woo-ram Jeon, Yongin-si (KR); Youn-ho Choi, Seoul (KR); Dae-myung Kim, Hwaseong-si (KR); Kyung-wan Park, Suwon-si (KR); Jae-young Huh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/371,821

(22) Filed: Apr. 1, 2019

(65) Prior Publication Data
US 2019/0228208 A1  Jul. 25, 2019

Related U.S. Application Data

(63) Continuation of application No. 14/990,075, filed on Jan. 7, 2016, now Pat. No. 10,255,481.

(30) Foreign Application Priority Data

Jun. 18, 2015  (KR) ........................ 10-2015-0086424
Jan. 6, 2016  (KR) ........................ 10-2016-0001623

(51) Int. Cl.
*H04N 5/232* (2006.01)
*G06F 3/01* (2006.01)
(Continued)

(52) U.S. Cl.
CPC ....... *G06K 9/00255* (2013.01); *G06F 1/1652* (2013.01); *G06F 3/012* (2013.01);
(Continued)

(58) Field of Classification Search
CPC ............ H04M 1/0268; H04N 5/23219; H04N 5/23293; H04N 5/23218;
(Continued)

(56) References Cited

U.S. PATENT DOCUMENTS 8,271,047 B2 *  9/2012  Kim ...................... G06F 1/1615
                                                                345/156
8,385,987 B2 *  2/2013  Kim ...................... G06F 1/1626
                                                                455/574
(Continued)

FOREIGN PATENT DOCUMENTS

CN  101894538 A  11/2010
CN  103369214 A  10/2013
(Continued)

OTHER PUBLICATIONS

Communication dated Jan. 25, 2018 issued by the European Patent Office in counterpart European Application No. 16150471.7.
(Continued)

*Primary Examiner* — Lin Ye
*Assistant Examiner* — John H Morehead, III
(74) *Attorney, Agent, or Firm* — Sughrue Mion, PLLC

(57) ABSTRACT

A display device for displaying an image and a method by which the display device operates to display an image are provided. The display device may include a display configured to output a screen image, an image sensor configured to acquire an image signal, a bending detection sensor configured to detect a bending motion or a bent state of the display device, and a control unit configured to control the display to display an image, which is generated based on the
(Continued)

image signal, in a region according to a position at which the display is bent on the screen image if the bending detection sensor detects the bending motion or a bent state.

24 Claims, 34 Drawing Sheets

Related U.S. Application Data

(60) Provisional application No. 62/102,232, filed on Jan. 12, 2015, provisional application No. 62/100,614, filed on Jan. 7, 2015.

(51) Int. Cl.
| | | |
|---|---|---|
| *H04M 1/02* | (2006.01) | |
| *G06K 9/00* | (2006.01) | |
| *G09G 5/14* | (2006.01) | |
| *G06F 3/0487* | (2013.01) | |
| *G06F 3/0482* | (2013.01) | |
| *G06F 3/0488* | (2013.01) | |
| *H04L 12/58* | (2006.01) | |
| *G06F 1/16* | (2006.01) | |

(52) U.S. Cl.
CPC ............ *G06F 3/017* (2013.01); *G06F 3/0482* (2013.01); *G06F 3/0487* (2013.01); *G06F 3/04883* (2013.01); *G06K 9/0061* (2013.01); *G06K 9/00604* (2013.01); *G09G 5/14* (2013.01); *H04L 51/10* (2013.01); *H04M 1/0268* (2013.01); *H04N 5/23218* (2018.08); *H04N 5/23219* (2013.01); *H04N 5/23293* (2013.01); *H04N 5/232935* (2018.08); *G06F 2203/04803* (2013.01); *G09G 2320/068* (2013.01); *G09G 2340/0464* (2013.01); *G09G 2354/00* (2013.01); *G09G 2380/02* (2013.01)

(58) Field of Classification Search
CPC ......... G06F 2203/04803; G06F 3/0482; G06F 3/0487; G06F 3/017; G06F 3/04883; G06F 3/012; G09G 2380/02; G09G 2354/00; G09G 2320/068; G09G 2340/0464; G06K 9/0061
See application file for complete search history.

(56) References Cited

U.S. PATENT DOCUMENTS

| | | |
|---|---|---|
| 8,466,851 B2 | 6/2013 | Huitema et al. |
| 8,502,788 B2 | 8/2013 | Cho |
| 8,543,166 B2 | 9/2013 | Choi et al. |
| 8,654,095 B1 | 2/2014 | Cho et al. |
| 8,988,391 B2 | 3/2015 | Reigneau |
| 9,019,415 B2 | 4/2015 | Ma |
| 9,239,594 B2 | 1/2016 | Lee et al. |
| 9,344,672 B2 | 5/2016 | Lee |
| 9,430,184 B2 | 8/2016 | Cho et al. |
| 9,448,660 B2 | 9/2016 | Seo et al. |
| 9,606,574 B2 | 3/2017 | Park et al. |
| 9,864,438 B2 | 1/2018 | Seo et al. |
| 10,114,476 B2 | 10/2018 | Seo et al. |
| 10,275,045 B2 | 4/2019 | Seo et al. |
| 2004/0263670 A1 | 10/2004 | Yamasaki |
| 2005/0140646 A1 | 6/2005 | Nozawa |
| 2006/0034042 A1 | 2/2006 | Hisano et al. |
| 2007/0075915 A1* | 4/2007 | Cheon ............... G06F 1/1647 345/1.1 |
| 2010/0117975 A1 | 5/2010 | Cho |
| 2010/0120470 A1 | 5/2010 | Kim et al. |
| 2010/0171683 A1 | 7/2010 | Huitema et al. |
| 2010/0182265 A1* | 7/2010 | Kim ............... G06F 1/1641 345/173 |
| 2011/0086680 A1 | 4/2011 | Kim et al. |
| 2011/0134087 A1 | 6/2011 | Moriwaki |
| 2011/0187681 A1 | 8/2011 | Kim et al. |
| 2013/0093669 A1 | 4/2013 | Park et al. |
| 2013/0135182 A1 | 5/2013 | Jung et al. |
| 2013/0145311 A1 | 6/2013 | Joo |
| 2013/0154971 A1 | 6/2013 | Kang et al. |
| 2013/0176248 A1 | 7/2013 | Shin et al. |
| 2013/0229324 A1 | 9/2013 | Zhang et al. |
| 2013/0265262 A1 | 10/2013 | Jung et al. |
| 2013/0300686 A1 | 11/2013 | Yoon et al. |
| 2013/0307816 A1* | 11/2013 | Lee .................. G06F 1/1684 345/174 |
| 2013/0335311 A1 | 12/2013 | Kim |
| 2014/0015743 A1 | 1/2014 | Seo et al. |
| 2014/0028596 A1 | 1/2014 | Seo et al. |
| 2014/0028823 A1 | 1/2014 | Tahk et al. |
| 2014/0035869 A1 | 2/2014 | Yun et al. |
| 2014/0049464 A1 | 2/2014 | Kwak et al. |
| 2014/0078047 A1 | 3/2014 | Seo et al. |
| 2014/0101560 A1 | 4/2014 | Kwak et al. |
| 2014/0118600 A1* | 5/2014 | Son ................... H04N 5/23293 348/333.11 |
| 2014/0192217 A1 | 6/2014 | Kim et al. |
| 2014/0187227 A1 | 7/2014 | Song |
| 2014/0285476 A1 | 9/2014 | Cho et al. |
| 2014/0361980 A1 | 12/2014 | Iwaki et al. |
| 2015/0331454 A1 | 11/2015 | Song et al. |
| 2015/0381929 A1 | 12/2015 | Lee |
| 2016/0062485 A1 | 3/2016 | Kondo |
| 2016/0085268 A1 | 3/2016 | Aurongzeb et al. |
| 2016/0321969 A1 | 11/2016 | Kambhatla |
| 2016/0370877 A1 | 12/2016 | Seo et al. |
| 2016/0373646 A1* | 12/2016 | Fredlund ............. G06F 21/32 |
| 2017/0052566 A1* | 2/2017 | Ka ................... G06F 1/1694 |
| 2018/0120954 A1 | 5/2018 | Seo et al. |
| 2019/0033984 A1 | 1/2019 | Seo et al. |
| 2019/0179425 A1 | 6/2019 | Seo et al. |

FOREIGN PATENT DOCUMENTS

| | | | |
|---|---|---|---|
| CN | 103425243 | A | 12/2013 |
| CN | 103442104 | A | 12/2013 |
| CN | 103631333 | A | 3/2014 |
| CN | 103645749 | A | 3/2014 |
| EP | 2500894 | A1 | 9/2012 |
| EP | 2613244 | A2 | 7/2013 |
| KR | 10-2010-0052227 | A | 5/2010 |
| KR | 10-2012-0130465 | A | 12/2012 |
| KR | 10-2013-0125653 | A | 11/2013 |
| KR | 10-2014-0016082 | A | 2/2014 |
| KR | 10-2014-0034578 | A | 3/2014 |
| TW | 200830234 | | 7/2008 |
| TW | 201413498 | A | 4/2014 |
| TW | 201415343 | A | 4/2014 |
| WO | 2014/030912 | A1 | 2/2014 |
| WO | 2014/042495 | A1 | 3/2014 |
| WO | 2014/119829 | A1 | 8/2014 |

OTHER PUBLICATIONS

Communication dated Jul. 1, 2016, issued by the International Searching Authority in counterpart International Application No. PCT/KR2016/000121 (PCT/ISA/210).
Communication dated Jun. 6, 2017, from the Intellectual Property Office of Taiwan in counterpart application No. 105100211.
Communication dated May 19, 2016 issued by European Patent Office in counterpart European Application No. 16150471.7.
Communication dated May 19, 2017, issued by the United States Patent and Trademark Office in counterpart U.S. Appl. No. 14/990,420.
Communication dated Nov. 29, 2017 issued by the United States Patent and Trademark Office in counterpart U.S. Appl. No. 14/990,420.
Communication dated Oct. 31, 2018, issued by the State Intellectual Property Office of P. R. China in Chinese Application No. 201680010331.0.
Communication dated Jan. 12, 2018, issued by the European Patent Office in counterpart European Patent Application No. 16735176.6.

(56) References Cited

OTHER PUBLICATIONS

International Search Report dated Jun. 14, 2016 issued by International Searching Authority in counterpart International Application No. PCT/KR2016/000138.
Teemu T Ammani E Mi et al: "What is a device bend gesture really good for?", Human Factors in Computing Systems, ACM, Apr. 26, 2014 (Apr. 26, 2014), pp. 3503-3512, XP0580468.
Written Opinion for PCT/KR2016/000121 dated Jul. 1, 2016 [PCT/ISA/237].
Communication dated Jul. 24, 2019 issued by the State Intellectual Property Office of P.R. China in counterpart Chinese Application No. 201680010331.0.
Communication dated Jul. 29, 2019 issued by the Korean Intellectual Property Office in counterpart Korean Application No. 10-2015-0061773.
Communication dated Nov. 5, 2019, issued by the State Intellectual Property Office of P.R. China in counterpart Chinese Application No. 201680013564.6.
Communication dated Feb. 25, 2020, issued by the Korean Intellectual Property Office in counterpart Korean Application No. 10-2015-0061773.
Communication dated Jul. 31, 2020 issued by the State Intellectual Property Office of P.R. China in counterpart Chinese Application No. 201680013564.6.
Communication dated Nov. 16, 2020, issued by the Korean Intellectual Property Office in corresponding Korean Application No. 10-2020-0089467.
Communication dated Nov. 12, 2020, issued by the USPTO in counterpart U.S. Appl. No. 15/909,512.
Communication dated Nov. 20, 2020, from the European Patent Office in counterpart European Application No. 16735176.6.
Communication dated Dec. 4, 2020, from the European Patent Office in counterpart European Application No. 20195156.3.

\* cited by examiner

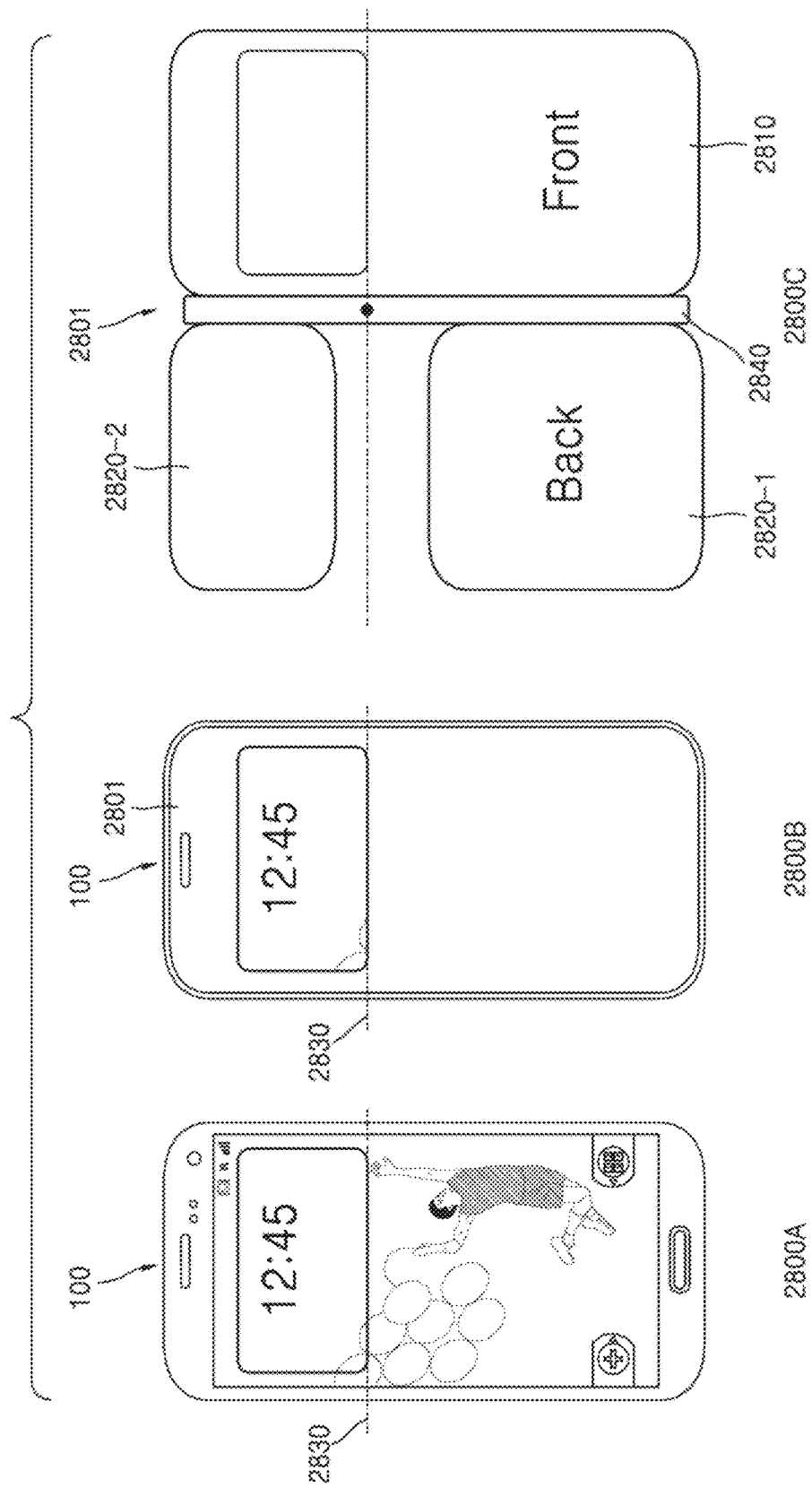

DISPLAY DEVICE AND OPERATING METHOD THEREOF WITH ADJUSTMENTS RELATED TO AN IMAGE DISPLAY ACCORDING TO BENDING MOTION OF THE DISPLAY DEVICE

CROSS-REFERENCE TO RELATED APPLICATIONS

This application is a continuation of U.S. patent application Ser. No. 14/990,075, filed on Jan. 7, 2016, which claims the benefit of U.S. Provisional Application No. 62/100,614, filed on Jan. 7, 2015, U.S. Provisional Application No. 62/102,232, filed on Jan. 12, 2015, in the U.S. Patent and Trademark Office, Korean Patent Application No. 10-2015-0086424, filed on Jun. 18, 2015 and Korean Patent Application No. 10-2016-0001623, filed on Jan. 6, 2016 in the Korean Intellectual Property Office, the contents of all of which are incorporated herein by reference in their entirety.

BACKGROUND

1. Field

Exemplary embodiments consistent with the present disclosure relate to a display device for displaying an image and a method by which the display device operates to display an image.

2. Description of the Related Art

Along with the development of display technology, various display devices for displaying an image have been developed. In addition, along with the development of display technology, a plurality of displays are included in a display device, or flexible devices, transparent display panels, and the like have been developed. A flexible display indicates a bendable display device.

In addition, along with the development of technology, various functions are provided to a user by using a display device. For example, the user may take a picture, search for information, and the like by using the display device. Therefore, a display device enabling a user to conveniently use functions of the display device and an operating method thereof are demanded.

SUMMARY

Provided are a display device and an operating method thereof.

Provided is a non-transitory computer-readable recording medium having recorded thereon a computer-readable program for performing the method.

Additional aspects will be set forth in part in the description which follows and, in part, will be apparent from the description, or may be learned by practice of the presented exemplary embodiments.

According to an aspect of an exemplary embodiment, a display device includes: a display configured to output a screen image; an image sensor configured to acquire an image signal; a bending detection sensor configured to detect a bending motion of the display device; and a control unit configured to control the display to display an image, which is generated based on the image signal, in a region according to a position at which the display is bent on the screen image if the bending detection sensor detects the bending motion.

The control unit may be further configured to determine the region based on a ratio of a horizontal length of the image to a vertical length thereof.

The display device may further include a lens configured to form an image of a subject on the image sensor, wherein the control unit is further configured to determine a region in which the image is to be displayed, based on a position at which the lens is disposed in the display device.

The control unit may be further configured to generate a non-processed image based on the image signal, recognize an object from the non-processed image, and generate a region including the recognized object in the non-processed image as the image.

The object may be a face of a user, which is included in the non-processed image.

The control unit may be further configured to recognize an eye of the user, which is included in the image, and a position of a pupil in the eye of the user and to generate a still image captured at a time point where the position of the pupil satisfies a preset condition if the position of the pupil satisfies the preset condition.

The control unit may be further configured to further display the image in a region except for the region through the display.

The display may include a touch screen configured to receive a touch input of the user, and if a touch input of the user on a region except for the region of the screen image is received, the control unit may generate a still image captured at a time point where the touch input is received.

The control unit may be further configured to further display a user interface object for controlling an operation of the display device, in a region except for the region of the screen image, through the display.

The display device may further include a distance sensor configured to detect a distance between the display device and the user, wherein the control unit is further configured to determine an area of the region based on the distance detected through the distance sensor.

According to an aspect of another exemplary embodiment, a method by which a display device operates includes: detecting a bending motion of a display; generating an image based on an image signal acquired through an image sensor; and if the bending motion of the display is detected, displaying the generated image in a region according to a position at which the display is bent.

The displaying may include determining the region based on a ratio of a horizontal length of the generated image to a vertical length thereof.

The displaying may include determining the region in which the image is to be displayed on the display device, based on a lens configured to form an image of a subject on the image sensor.

The generating of the image may include: generating a non-processed image based on the image signal; recognizing an object by performing image recognition on the non-processed image; and generating a region including the recognized object in the non-processed image as the image.

The object may be a face of a user, which is included in the non-processed image.

The method may further include: recognizing an eye of the user, which is included in the image, and a position of a pupil in the eye of the user; and generating a still image captured at a time point where the position of the pupil satisfies a preset condition if the position of the pupil satisfies the preset condition.

The displaying may include displaying the image in a region except for the region through the display.

The method may further include: receiving a touch input of the user on a region except for the region of the screen image; and generating a still image captured at a time point where the touch input is received.

The displaying may include further displaying a user interface object for controlling an operation of the display device, in a region except for the region of the screen image, through the display.

The method may further include detecting a distance between the display device and the user, wherein the displaying includes determining an area of the region based on the distance detected through the distance sensor.

According to an aspect of another exemplary embodiment, a non-transitory computer-readable recording medium records thereon a computer-readable program for performing the method.

In one exemplary embodiment, there is a display device including: a display; an image sensor configured to generate an image signal based on an acquired image; a sensor configured to detect a bending motion or a bent state of the display device; and a control unit configured to control the display to display an output image, which is generated based on the image signal, in a region of the display based on a position at which the display is bent when the sensor detects the bending motion.

The control unit may be further configured to determine the region based on a ratio of a horizontal length of the output image to a vertical length thereof.

The display device may further include a lens configured to form the acquired image on the image sensor, wherein the control unit may be further configured to determine the region in which the output image is to be displayed, based on a position at which the lens is disposed in the display device.

The control unit may be further configured to generate a non-processed image based on the image signal, recognize an object in the non-processed image, and determine a region including the recognized object in the non-processed image as the output image.

The object may be a face of a user, which is included in the non-processed image.

The control unit may be further configured to recognize an eye of a user, which is included in the acquired image, and to determine a position of a pupil in the eye of the user and to generate a still image captured at a time point when the position of the pupil satisfies a preset condition.

The region may be a first region and the control unit may be further configured to further control to display the output image in a second region that is outside the first region, using the display.

The display may include a touch screen configured to receive a touch input of the user, the region is a first region, and when the touch input of the user is received on a second region that is outside of the first region, the control unit may generate a still image captured at a time point when the touch input is received.

The region may be a first region, the control unit may be further configured to further display a user interface object for controlling an operation of the display device, in a second region that is outside of the first region, using the display.

The display device may further include a distance sensor configured to detect a distance between the display device and a user, wherein the control unit may be further configured to determine an area of the region based on the distance detected by the distance sensor.

In yet another exemplary embodiment, there is a method of operating a display device, the method including: detecting a bending motion or a bent state of a display; generating by an image sensor, an image signal based on an acquired image; and when the bending motion or the bent state of the display is detected, displaying an output image from the image signal, in a region based on a position at which the display is bent.

The displaying may include determining the region based on a ratio of a horizontal length of the output image to a vertical length thereof.

The displaying may include determining the region in which the output image is to be displayed on the display device, based on a lens configured to form the acquired image of a subject on the image sensor.

The generating of the image may include: generating a non-processed image based on the image signal; recognizing an object by performing image recognition in the non-processed image; and determining a region including the recognized object in the non-processed image as the output image.

The object may be a face of a user, which is included in the non-processed image.

The method may further include: recognizing an eye of the user, which is included in the acquired image, and determining a position of a pupil in an eye of a user; and generating a still image captured at a time point when the position of the pupil satisfies a preset condition.

The region may be a first region and the displaying may include displaying the output image in a second region that is outside of the first region, using the display.

The method may further include: receiving a touch input of a user on a second region that is outside of the first region; and generating a still image captured at a time point when the touch input is received.

The displaying may include further displaying a user interface object for controlling an operation of the display device, in a second region that is outside of first the region, using the display.

The method may further include detecting a distance between the display device and a user, wherein the displaying includes determining an area of the region based on the distance detected by the distance sensor.

BRIEF DESCRIPTION OF THE DRAWINGS

These and/or other aspects will become apparent and more readily appreciated from the following description of the exemplary embodiments, taken in conjunction with the accompanying drawings in which:

FIG. 28 illustrates a cover mountable on the display device, according to an exemplary embodiment.

DETAILED DESCRIPTION

Figure 1:
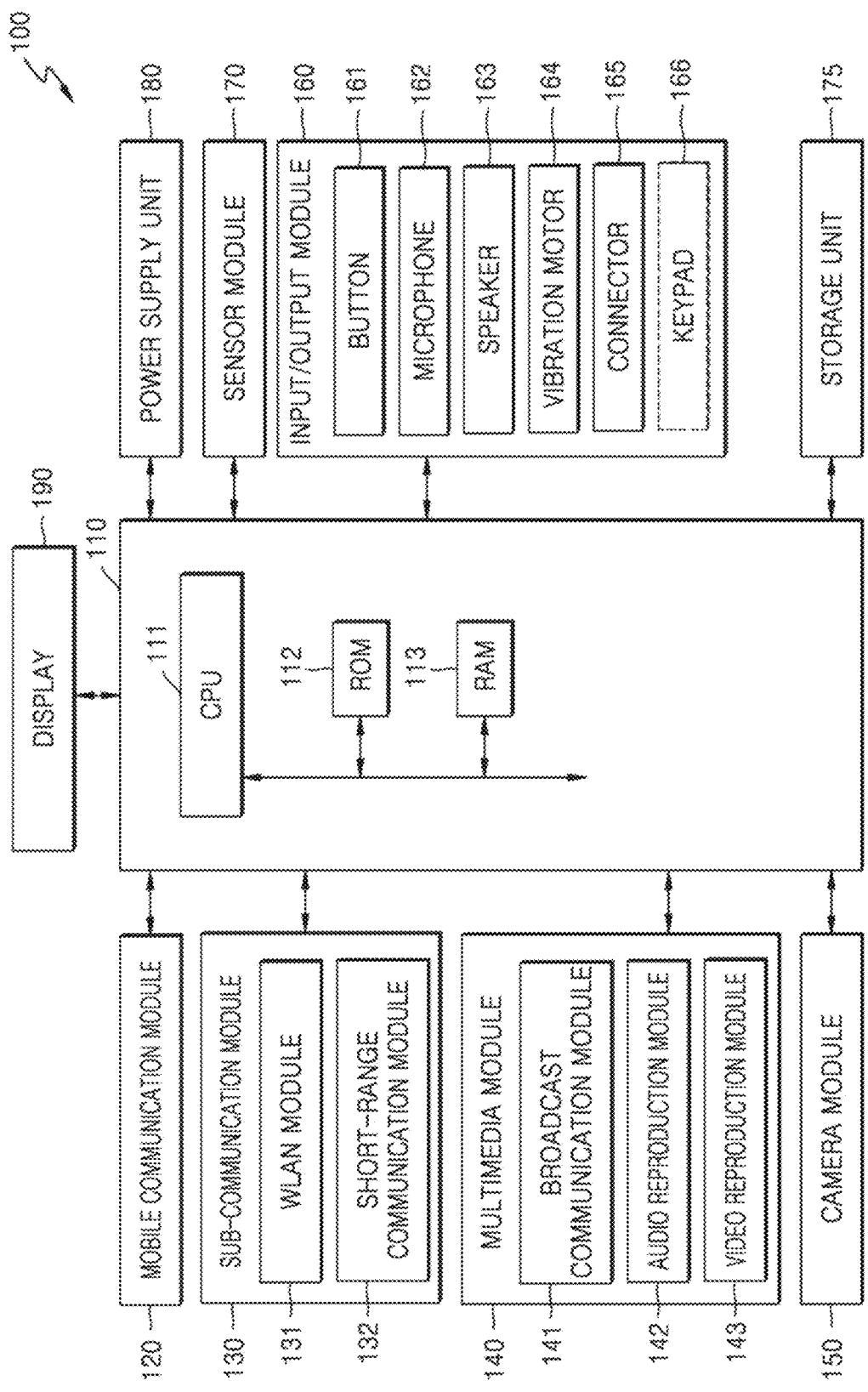
FIG. 1 illustrates a block diagram of a display device according to an exemplary embodiment.

Reference will now be made in detail to exemplary embodiments, examples of which are illustrated in the accompanying drawings. In the drawings, parts irrelevant to the description are omitted to clearly describe the exemplary embodiments, and like reference numerals denote like elements throughout the specification. In this regard, the present exemplary embodiments may have different forms and should not be construed as being limited to the descriptions set forth herein. Accordingly, the exemplary embodiments are merely described below, by referring to the figures, to explain aspects. As used herein, expressions such as "at least one of," when preceding a list of elements, modify the entire list of elements and do not modify the individual elements of the list.

Throughout the specification, when it is described that a certain part is "connected" to another part, it should be understood that the certain part may be "directly connected" to another part or "electrically connected" to another part via another element in the middle. In addition, when a component "includes" an element, unless there is another opposite description thereto, it should be understood that the component does not exclude another element but may further include another element.

In the specification, the term "touch" or "touch input" may indicate a direct contact or a case where a display device detects a body of a user who comes close to the display device (e.g., within 2 cm).

In the specification, the term "bending" indicates a case where a display device is bent due to an application of an external force or is in a bent state due to an application of an external force. In addition, the term "bending motion" indicates a motion of bending a display device. According to exemplary embodiments, various bending motions may exist. For example, a bending motion according to an exemplary embodiment may include bending of a display device using a hinge of the display device and all bending motions of a display device due to a folding gesture, a rolling gesture, a shaking gesture, a flapping gesture, a bending gesture, and the like of a user.

Hereinafter, the exemplary embodiments are described in detail with reference to the accompanying drawings.

FIG. 1 illustrates a block diagram of a display device 100 according to an exemplary embodiment. The display device 100 shown in FIG. 1 is only illustrative, and the display device 100 according to the present exemplary embodiment may include more or less components than the shown components.

The display device 100 may be connected to external devices (not shown) via a mobile communication module 120, a sub-communication module 130, and a connector 165. The external devices may include at least one of another device (not shown), a cellular phone (not shown), a smartphone (not shown), a tablet personal computer (PC) (not shown), and a server (not shown) but are not limited thereto.

Referring to FIG. 1, the display device 100 may include a display 190. In addition, the display device 100 may include a control unit 110, the mobile communication module 120, the sub-communication module 130, a multimedia module 140, a camera module 150, an input and output module 160, a sensor module 170, a storage unit 175, and a power supply unit 180. The sub-communication module 130 may include at least one of a wireless local area network (WLAN) module 131 and a short-range communication module 132, and the multimedia module 140 may include at least one of a broadcast communication module 141, an audio reproduction module 142, and a video reproduction module 143. The input and output module 160 may include at least one of a button 161, a microphone 162, a speaker 163, a vibration motor 164, a connector 165, and a keypad 166. Each of the aforementioned modules are implemented in hardware, in an exemplary embodiment. In another exemplary embodiment, the aforementioned modules are implemented in a mixture of hardware and software or are all implemented in software.

The control unit 110 may include a central processing unit (CPU) 111, a read-only memory (ROM) 112 for storing a control program for control of the display device 100, and a random access memory (RAM) 113 used to memorize a signal or data inputted from the outside of the display device 100 or used as a memory region for an operation performed by the display device 100. The CPU 111 may include a single-core processor or a multi-core processor such as a dual-core processor, a triple-core processor, or a quad-core processor. The CPU 111, the ROM 112, and the RAM 113 may be interconnected through an internal bus.

The control unit 110 may control the mobile communication module 120, the sub-communication module 130, the multimedia module 140, the camera module 150, the input and output module 160, the sensor module 170, the storage unit 175, the power supply unit 180, and the display 190.

The mobile communication module 120 may connect the display device 100 to an external device through mobile communication by using at least one antenna (not shown) under control of the control unit 110. The mobile communication module 120 may transmit/receive a wireless signal for transmission/reception of a voice call, a video call, a text message (short message service (SMS), or a multimedia message (multimedia message service (MMS)) to/from a cellular phone (not shown), a smartphone (not shown), a tablet PC (not shown), or another device (not shown) having a telephone number inputted to the display device 100.

The sub-communication module 130 may include at least one of the WLAN module 131 and the short-range communication module 132. For example, the sub-communication module 130 may include only the WLAN module 131, only the short-range communication module 132, or both the WLAN module 131 and the short-range communication module 132.

The WLAN module 131 may connect, under control of the control unit 110, to the Internet at a place at which a wireless access point (AP) is installed. The WLAN module 131 may support a WLAN standard IEEE802.11x of The Institute of Electrical and Electronics Engineers (IEEE). The short-range communication module 132 may perform short-range communication between the display device 100 and an image forming apparatus (not shown) in a wireless manner under control of the control unit 110. Short-range communication schemes may include Bluetooth, infrared data association (IrDA), Zig-bee, and the like.

The display device 100 may include at least one of the mobile communication module 120, the WLAN module 131, and the short-range communication module 132 according to the performance thereof.

The multimedia module 140 may include at least one of the broadcast communication module 141, the audio reproduction module 142, and the video reproduction module 143. The broadcast communication module 141 may receive a broadcast signal (e.g., a television (TV) broadcast signal, a radio broadcast signal, or a data broadcast signal) and broadcast additional information (e.g., electric program guide (EPG) or electric service guide (ESG)) transmitted from a broadcast station through a broadcast communication antenna (not shown) under control of the control unit 110. The audio reproduction module 142 may reproduce a stored or received digital audio file under control of the control unit 110. The video reproduction module 143 may reproduce a stored or received digital video file under control of the control unit 110. The video reproduction module 143 may reproduce a digital audio file.

The multimedia module 140 may include the audio reproduction module 142 and the video reproduction module 143 except for the broadcast communication module 141. In addition, the audio reproduction module 142 or the video reproduction module 143 may be included in the control unit 110.

The camera module 150 may capture a still image or a video under control of the control unit 110. The camera module 150 may include at least one camera configured to capture a still image or a video. In addition, the camera module 150 may include an image sensor configured to acquire an image and generate an image signal based on the acquired image. In addition, the camera module 150 may include an auxiliary light source (not shown) configured to provide light required for capturing. When the camera module 150 includes a plurality of cameras, one camera may be disposed on the front surface of the display device 100, and another camera may be disposed on the rear surface of the display device 100. Alternatively, a plurality of cameras may be disposed to be adjacent to each other (e.g., with an interval of 1 cm to 8 cm) and capture a three-dimensional (3D) still image or a 3D video.

The input and output module 160 may include at least one of a plurality of buttons 161, the microphone 162, the speaker 163, the vibration motor 164, the connector 165, and the keypad 166.

The button 161 may be formed on the front surface, side surfaces, or the rear surface of a housing of the display device 100 and may include at least one of a power/lock button (not shown), a volume button (not shown), a menu button (not shown), a home button (not shown), a back button (not shown), and a search button (not shown).

The microphone 162 may receive a voice or a sound and generate an electrical signal under a control of the control unit 110.

The speaker 163 may output a sound corresponding to various signals of the mobile communication module 120, the sub-communication module 130, the multimedia module 140, or the camera module 150 to the outside of the display device 100 under control of the control unit 110. The speaker 163 may output a sound corresponding to a function performed by the display device 100. The speaker 163 may be formed one or plural in number at an appropriate location or appropriate locations of the housing of the display device 100.

The vibration motor 164 may convert an electrical signal into mechanical vibrations under control of the control unit 110. For example, when a voice call is received from another device (not shown), the display device 100 in a vibration mode may operate the vibration motor 164.

The connector 165 may be used as an interface for connecting the display device 100 to an external device (not shown) or a power source (not shown). Data stored in the storage unit 175 of the display device 100 may be transmitted to an external device (not shown) or data may be received from an external device (not shown) through a wired cable connected to the connector 165 under control of the control unit 110. Through the wired cable connected to the connector 165, power may be inputted from a power source (not shown), or a battery (not shown) may be charged. The keypad 166 may receive a key input from a user to control the display device 100. The keypad 166 may include a physical keypad (not shown) formed on the display device 100 and a virtual keypad displayed on the display device 100. The physical keypad formed on the display device 100 may not be included according to the performance or a structure of the display device 100.

The sensor module 170 may include at least one sensor configured to detect a state of the display device 100. For example, the sensor module 170 may include at least one of a proximity sensor (not shown) configured to detect the user approaching the display device 100, an illuminance sensor (not shown) configured to detect the intensity of surrounding light, and a motion sensor (not shown) configured to detect an operation of the display device 100 (e.g., a rotation of the display device 100 or an acceleration or vibrations applied to the display device 100). Sensors of the sensor module 170 may be added or removed according to the desired functions or performance of the display device 100.

The storage unit 175 may store an input and/or output signal or data corresponding to an operation of the mobile communication module 120, the sub-communication module 130, the multimedia module 140, the camera module 150, the input and output module 160, the sensor module 170, and the display 190 under control of the control unit 110. The storage unit 175 may store a control program and applications for control of the display device 100 or the control unit 110.

The term "storage unit" may include the storage unit 175, the ROM 112 and the RAM 113 in the control unit 110, or a memory card (not shown) inserted into the display device 100. The storage unit may include a nonvolatile memory, a volatile memory, a hard disk drive (HDD), or a solid state drive (SSD).

The power supply unit 180 may supply power to at least one battery (not shown) disposed in the housing of the display device 100 under control of the controller 110. In addition, the power supply unit 180 may supply, to each part of the display device 100, power inputted from an external power source (not shown) through a wired cable connected to the connector 165.

The display 190 may output a screen image (i.e., an output image) corresponding to various services to the user. The screen image displayed on the display 190 may include an image captured using the camera module 150, a user interface for providing a service, and the like. In addition, according to an exemplary embodiment, the display 190 may include a flexible display that is bendable according to an applied force for causing a bending motion of the housing of the display device 100. In addition, according to another exemplary embodiment, the display 190 may include a plurality of modules. For example, the display 190 may include a first display and a second display. In addition, according to one or more exemplary embodiments, the display 190 may include a touch screen and a touch screen controller. The touch screen may transmit an analog signal corresponding to at least one touch inputted on the user interface to the touch screen controller. The touch screen may receive at least one touch input by means of a body part (e.g., a finger) of the user or a touchable input means (e.g., a stylus pen). In addition, the touch screen may transmit an analog signal corresponding to a continuous motion of a touch input to the touch screen controller. The touch screen may be implemented by, for example, a resistive overlay scheme, a capacitive scheme, an infrared scheme, or an ultrasound wave scheme. The touch screen controller may convert the analog signal received from the touch screen into a digital signal (e.g., an X coordinate value and a Y coordinate value) and transmit the digital signal to the control unit 110. The control unit 110 may control the touch screen by using the digital signal received from the touch screen controller.

Figure 2:
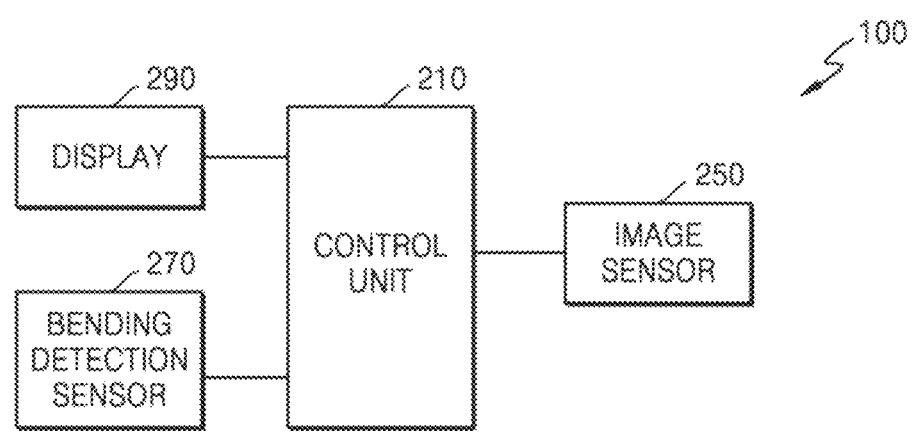
FIG. 2 illustrates a schematic block diagram of the display device according to an exemplary embodiment.

FIG. 2 illustrates a schematic block diagram of the display device 100 according to an exemplary embodiment. FIG. 2 only illustrates the display device 100 according to an exemplary embodiment, and the display device 100 according to the present exemplary embodiment may include more or less components than the shown components.

The display device 100 may include a display 290 configured to output a screen image, an image sensor 250 configured to acquire an image signal, a bending detection sensor 270 configured to detect a bending motion or a bent state, and a control unit 210 configured to control each component of the display device 100. When the display device 100 cannot be bent, the bending detection sensor 270 may not be included in the display device 100.

According to an exemplary embodiment, the image sensor 250 may be included in the camera module 150 of FIG. 1. The image sensor 250 includes a device for generating an image signal by accumulating an image focused on a sensor, for example, a charge coupled device (CCD) image sensor or a complementary metal-oxide semiconductor (CMOS) image sensor, in detection elements included in the sensor as a charge packet.

The display 290 may display a screen image including image information to be provided to the user. For example, the display 290 may display a preview image generated based on an image signal acquired by the image sensor 250. The preview image indicates an image displayed in order for the user to check in advance, an image to be acquired during capturing of a still image or a video when the user captures a still image or a video. The preview image may be a real-time image acquired by the image sensor 250 but is not limited thereto. Alternatively, the display 290 may display a user interface through which the user receives a service from the display device 100 or image content. However, the display 290 is not limited to the examples described above.

The bending detection sensor 270 indicates a sensor configured to detect a bending motion or a bent state of the display device 100. Information acquired by the control unit 210 according to detection of a bending motion or a bent state by the bending detection sensor 270 may vary according to exemplary embodiments. For example, when only a partial portion of the display device 100 is bendable by using a hinge or the like, the control unit 210 may determine whether a bending motion or a bent state has occurred by using the bending detection sensor 270. Alternatively, the control unit 210 may determine whether a bending motion or a bent state has occurred and there is a bent angle (e.g., 10°, 20°, or the like) of the display device 100 according to the bending motion by using the bending detection sensor 270. As another example, when all parts of the display device 100 are bendable by using a flexible display, the control unit 210 may further acquire information about a position from which a bending motion or a bent state is detected. However, the present exemplary embodiment is not limited thereto.

According to an exemplary embodiment, the control unit 210 may determine a region in which an image is to be displayed on the display 290 and control the display 290 to display the image in the determined region. For example, when the display device 100 displays a preview image to capture a still image or a video, the control unit 210 may control the display 290 to display a preview image in a partial region around a position at which a lens (not shown) of the camera module 150 of FIG. 1 so that the user easily check the preview image. As another example, when a bending motion or a bent state is detected by the bending detection sensor 270 of the display device 100, the control unit 210 may control the display 290 to display an image in any one of regions divided based on a point where the display device 100 is bent.

Figure 3:
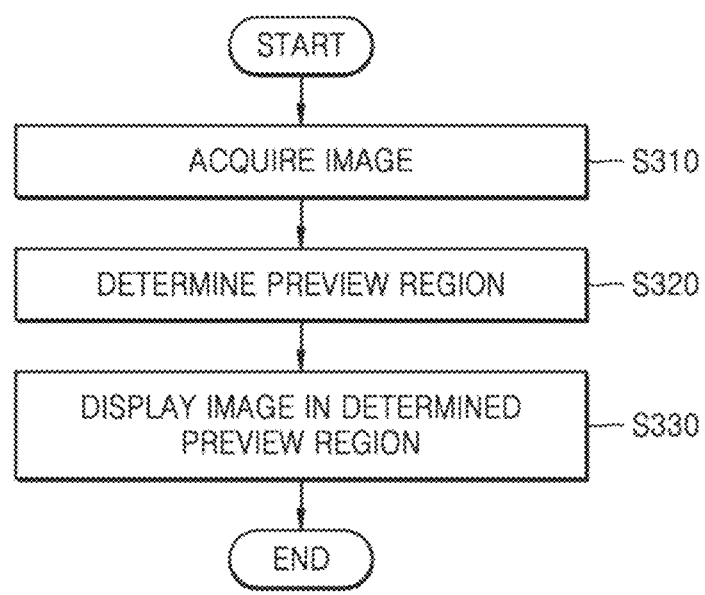
FIG. 3 illustrates a flowchart of a process in which the display device operates, according to an exemplary embodiment.

FIG. 3 illustrates a flowchart of a process in which the display device 100 operates, according to an exemplary embodiment. The process of FIG. 3 relates to an operation of displaying a preview image among operations of the display device 100. According to exemplary embodiments, a preview region of the process described with reference to FIG. 3 may be replaced by another region.

In operation S310, the display device 100 may acquire an image to be displayed and generate an image signal. According to an exemplary embodiment, when the display device 100 is bendable, in response to detection of a bending motion or a bent state of the display device 100, the display device 100 may perform operation S310. For example, when the user bends the display device 100, the display device 100 may execute an application for image capturing and generate a preview image. As another example, when the display device 100 cannot be bent, the display device 100 may acquire a preview image by executing the application for image capturing based on a user input through the touch screen. However, the present embodiment is not limited thereto.

In operation S320, the display device 100 may determine a region in which an image is to be displayed. That is, when the application for image capturing is executed and a preview image is acquired in operation S310, the display device 100 may determine a preview region. The preview region may indicate a region in which a preview image is displayed. For example, when the display device 100 is bent, the display device 100 may determine at least a portion of a region disposed at an upper end of a point at which the display device 100 is bent as the preview region among the whole region of a display included in the display device 100. A method of determining a region in which an image is to be displayed may be variously implemented according to exemplary embodiments.

In operation S330, the display device 100 may display an image in the determined region (e.g., the preview region). Herein, the display device 100 may display a user interface or the like in a region except for the region in which the image is displayed.

Figure 4:
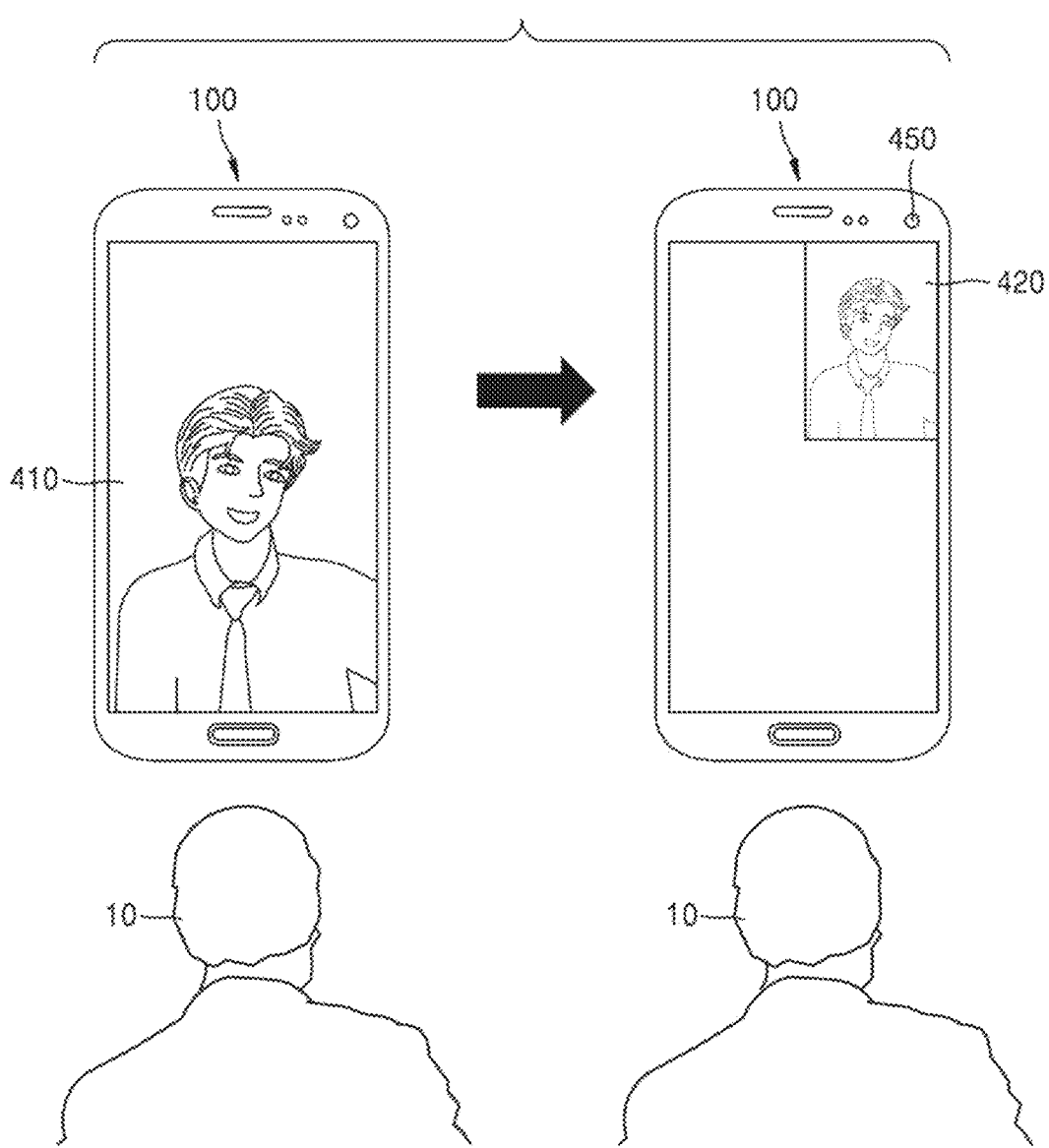
FIG. 4 illustrates an example in which the display device displays an image, according to an exemplary embodiment.

FIG. 4 illustrates an example in which the display device 100 displays an image, according to an exemplary embodiment.

Referring to FIG. 4, the display device 100 may display a preview image 410 when a user 10 desires to capture an image of the user 10. In general, the preview image 410 is displayed in almost the whole region of a display of the display device 100. In this case, when the user 10 gazes at the preview image 410, the eyes of the user 10 photographed by the display device 100 do not orient to a lens 450 of a camera, and thus, an unnatural image of the user is captured.

Therefore, according to an exemplary embodiment, the display device 100 may display a small-sized preview image 420 at a location at which the lens 450 of the camera is disposed. The user 10 may easily capture a natural figure of the user 10 by capturing an image by means of the display device 100 while viewing the small-sized preview image 420.

A size of the preview image 420 shown in FIG. 4 may be determined differently according to exemplary embodiments. According to an exemplary embodiment, since the preview image 420 may be displayed at a distance closer to the lens 450 as the size of the preview image 420 is smaller, the preview image 420 needs to be displayed as small as possible. However, if the size of the preview image 420 is too small, it is difficult for the user 10 to recognize or see the preview image 420, and thus, the preview image 420 needs to have an appropriate size for viewing. Therefore, the display device 100 may determine the size of the preview image 420 such that the preview image 420 has the smallest size recognizable by the user 10. The size of the preview image 420 may include at least one of a vertical length, a horizontal length, a ratio of the vertical length of the preview image 420 to a vertical length of the display of the display device 100, a ratio of the horizontal length of the preview image 420 to a horizontal length of the display of the display device 100, and a ratio of an area of the preview image 420 to an area of the display of the display device 100. According to one or more exemplary embodiments, the display device 100 may determine the size of the preview image 420 according to a distance from an eye of the user 10 to the display device 100. According to an exemplary embodiment, the size of the preview image 420 may be determined based on the size of the display, an eye size of the preview image 410 displayed on a full screen, and a minimum eye size according to a distance from the display device 100 to the user 10. That is, when the size of the display (herein, the size of the display indicates the vertical length of the display) is 110 mm, the eye size of the preview image 410 is 2.5 mm, and the minimum eye size according to a distance (e.g., 50 cm) from the display device 100 to the user 10 is 0.8 mm, the size of the preview image 420 is 35.2 mm based on Equation 1.

$$110:2.5=X:0.8 \qquad \text{EQN. (1)}$$

In Equation 1, X denotes the size of the preview image 420, and the eye size of the preview image 410 may be acquired by performing image recognition on the preview image 410. In addition, the distance from the display device 100 to the user 10 may be detected using a distance measurement sensor included in the sensor module 170 of FIG. 1 or acquired by the control unit 110 of FIG. 1 performing image recognition on an image acquired using the camera module 150 of FIG. 1, but is not limited thereto. The minimum eye size according to a distance from the display device 100 to the user 10 may be pre-stored in the display device 100 or determined using a preset algorithm. According to one or more exemplary embodiments, sizes of the preview image 420 according to distances of the display device 100 to the user 10 may be preset in the display device 100, and the display device 100 may display the preview image 420 having a preset size based on the preset sizes.

The size of the preview image 420 may vary according to the size of the display of the display device 100, a face of the user 10, and a resolution of a camera sensor but is not limited thereto.

FIGS. 5A through 5C and 6A through 6B illustrate examples in which the display device 100 displays an image, according to one or more other exemplary embodiments.

According to an exemplary embodiment, in operation S320 of FIG. 3, the control unit 210 of FIG. 2 may determine a region in which an image is to be displayed based on a location at which a lens 550-1, 550-2, or 550-3 of a camera is disposed.

Referring to 500A, when the lens 550-1 is disposed at a right upper end of the display device 100, the control unit 210 may determine a right upper end region 510-1 of the display 290 of FIG. 2 as a preview region. Referring to FIG. 500B, when the lens 550-2 is disposed at a central upper end of the display device 100, the control unit 210 may determine a central upper end region 510-2 of the display 290 as the preview region. Referring to 500C, when the lens 550-3 is disposed at a left upper end of the display device 100, the control unit 210 may determine a left upper end region 510-3 of the display 290 as the preview region.

Figure 5A:
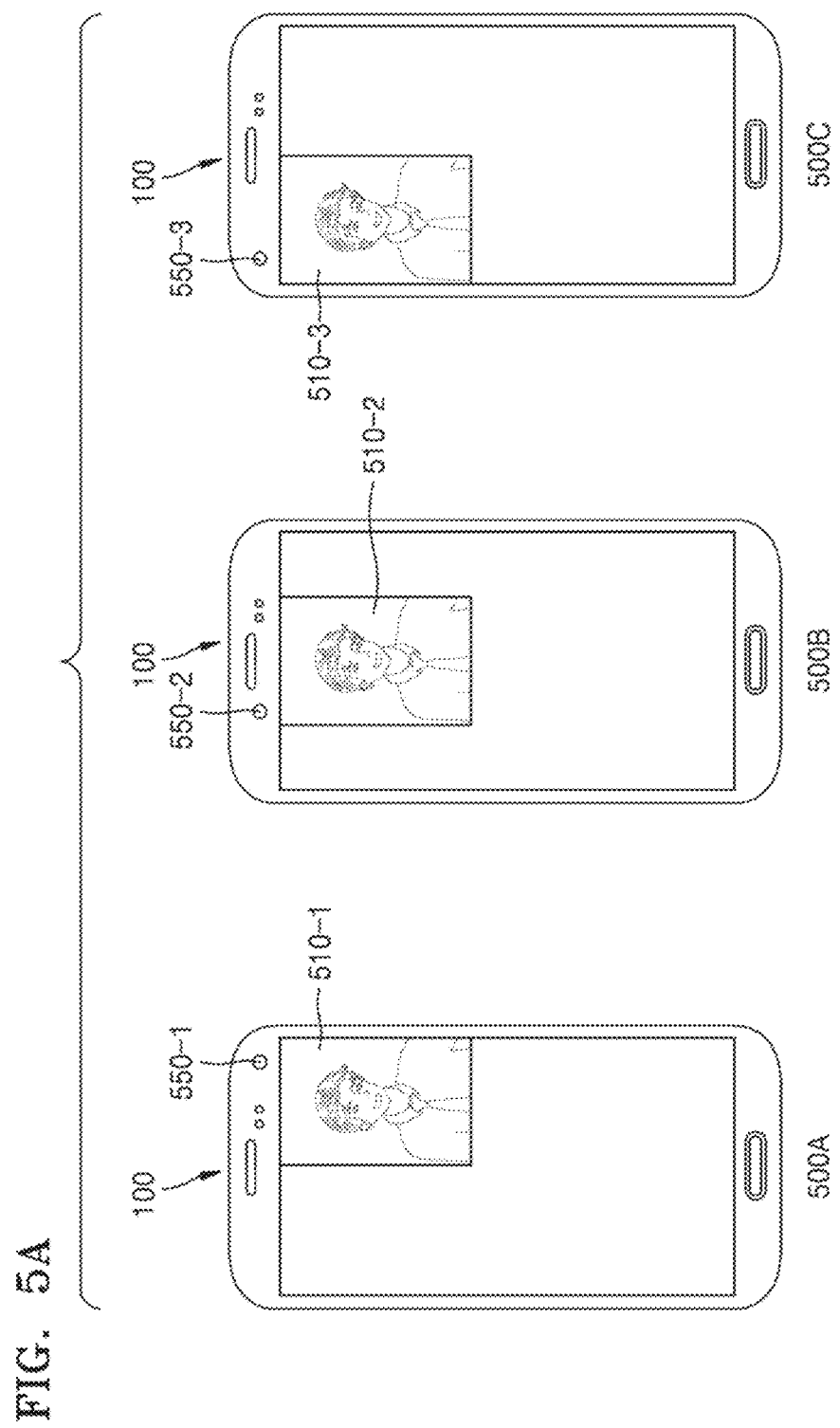
FIGS. 5A through 6B illustrate examples in which the display device displays an image, according to one or more other exemplary embodiments.
Figure 5B:
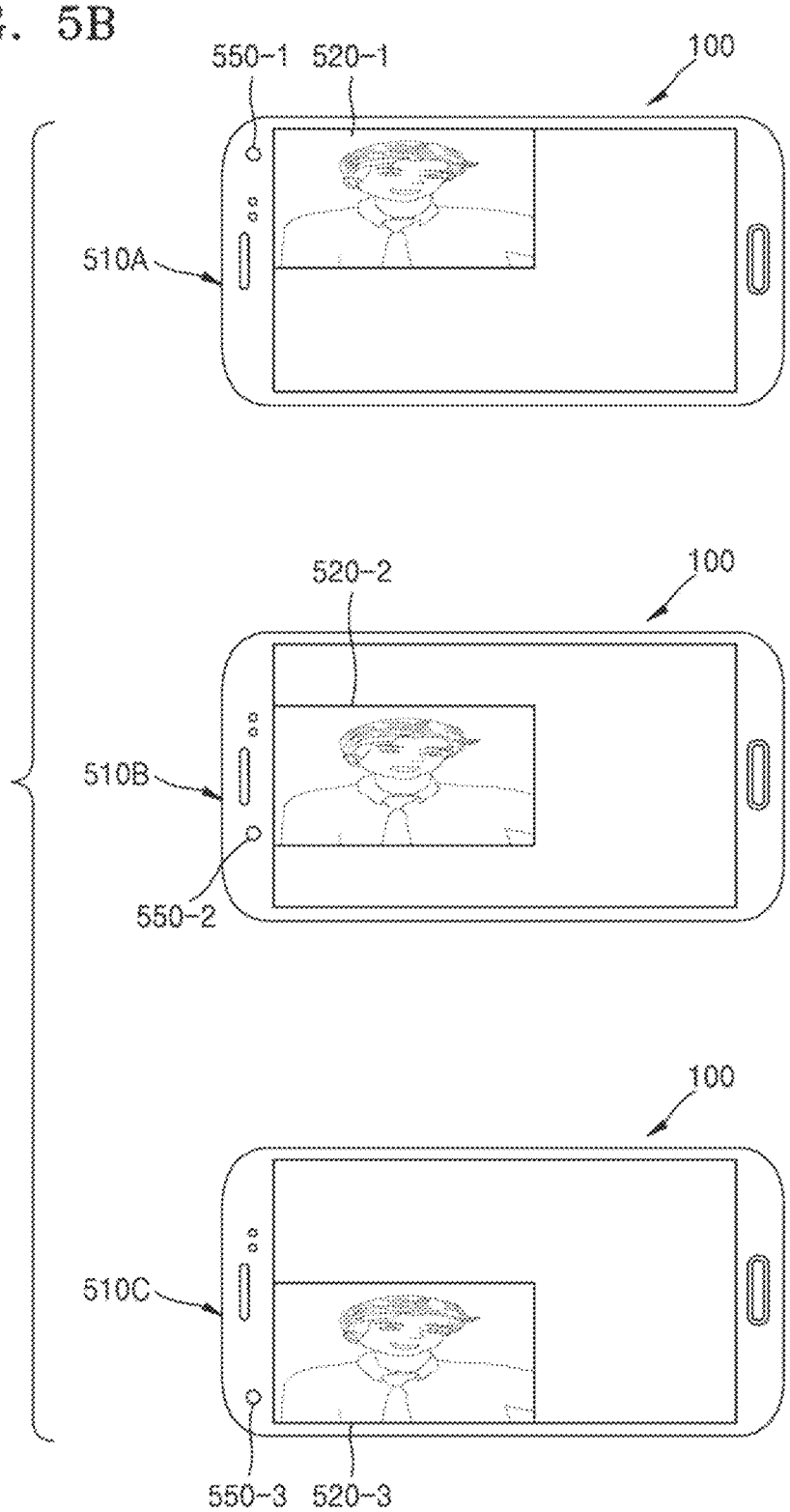

FIG. 5B illustrates an example in which the display device 100 displays an image when a user captures the image while holding the display device 100 in a horizontal direction, according to an exemplary embodiment.

Referring to 510A, when the lens 550-1 is disposed at a left upper end of the display device 100, the control unit 210 may determine a left upper end region 520-1 of the display 290 as the preview region. Referring to 510B, when the lens 550-2 is disposed at a central left end of the display device 100, the control unit 210 may determine a central left end region 520-2 of the display 290 as the preview region. Referring to FIG. 510C, when the lens 550-3 is disposed at a left lower end of the display device 100, the control unit 210 may determine a left lower end region 520-3 of the display 290 as the preview region.

Referring to FIGS. 5A and 5B, a ratio of a vertical length of the image to a horizontal length of the image may be, for example, 4:3 or 16:9 when the vertical length of the image is longer than the horizontal length of the image. Alternatively, the ratio of the vertical length of the image to the horizontal length of the image may be, for example, 3:4 or 9:16 when the vertical length of the image is shorter than the horizontal length of the image.

The location at which the lens 550-1, 550-2, or 550-3 of the camera may be preset in the display device 100. Alternatively, when a location of a lens is changeable, the control unit 110 may detect the location of the lens by using a separate sensor. However, the present exemplary embodiment is not limited thereto.

Figure 5C:
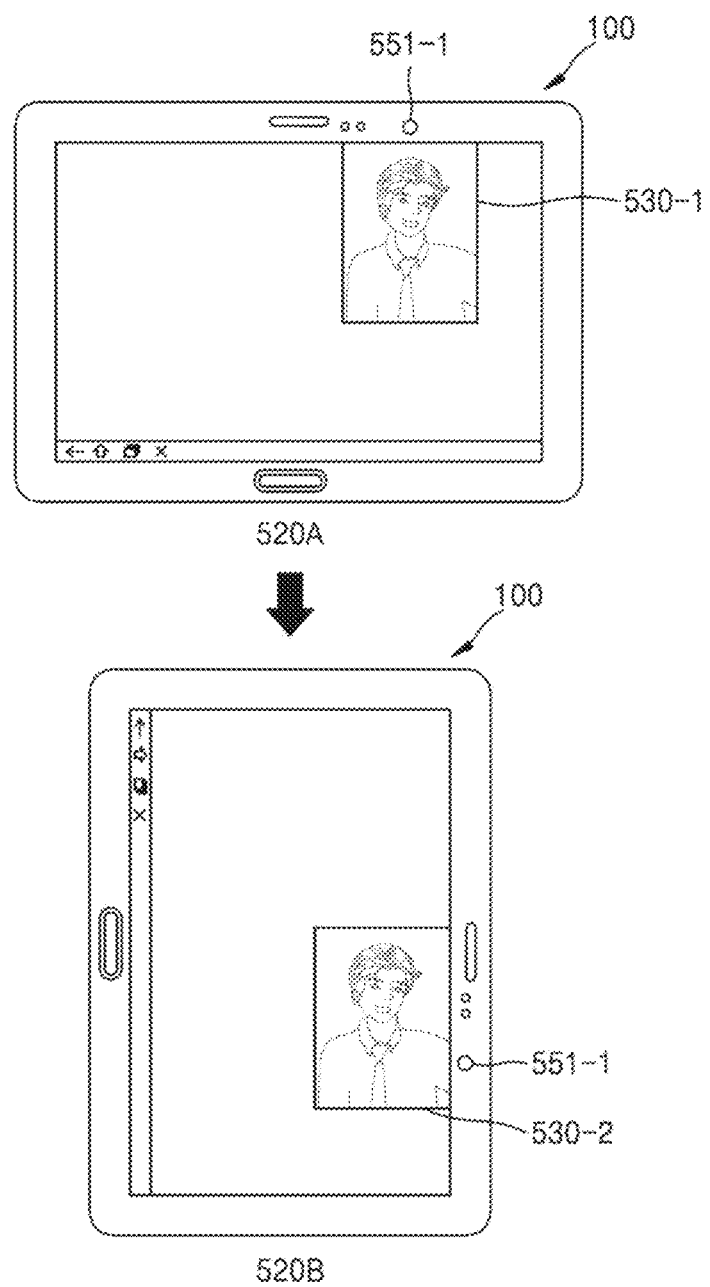

FIG. 5C illustrates an example in which the display device 100 displays an image when a user captures the image while holding the display device 100 in a horizontal direction and while holding the display device 100 in a vertical direction, according to an exemplary embodiment.

Referring to 520A, when a lens 551-1 is disposed at a central upper end of the display device 100, the control unit 210 may determine a central upper end region 530-1 of the display 290 as a preview region based on a location at which the lens 551-1 of a camera is disposed.

Referring to 520B, when the user captures the image while holding the display device 100 in the vertical direction according to an exemplary embodiment, the control unit 210 may determine a central right end region 530-2 of the display 290 as the preview region based on a location at which the lens 551-1 of the camera is disposed.

According to an exemplary embodiment, if the user captures an image while holding the display device 100 after turning the display device 100 from the horizontal direction to the vertical direction, the control unit 110 may move and display the image by adjusting a preview region so as to be close to a location at which a lens of a camera is disposed.

Referring to FIG. 5C, a ratio of a vertical length of the image to a horizontal length of the image may be, for example, 4:3 or 16:9 when the vertical length of the image is longer than the horizontal length of the image. Alternatively, the ratio of the vertical length of the image to the horizontal length of the image may be, for example, 3:4 or 9:16 when the vertical length of the image is shorter than the horizontal length of the image.

As shown in FIGS. 5A through 5C, according to an exemplary embodiment, the control unit 210 may maintain a constant distance between an eye of a user viewing a displayed image and a camera by determining a region in which an image is to be displayed based on a location at which the lens 550-1, 550-2, 550-3, or 551-1 of the camera is disposed.

According to another exemplary embodiment, in operation S320 of FIG. 3, the control unit 210 of FIG. 2 may determine a region in which an image is to be displayed based on a ratio of a vertical length of the image to be displayed to a horizontal length of the image to be displayed.

For example, if the vertical length of the image to be displayed is longer than the horizontal length of the image to be displayed (e.g., vertical length:horizontal length is 4:3 or 16:9), the control unit 210 may determine the region in which an image is to be displayed according to a location at which the 550-1, 550-2, or 550-3 is disposed as shown in FIG. 5A.

As another example, if the vertical length of the image to be displayed is shorter than the horizontal length of the image to be displayed (e.g., vertical length:horizontal length is 3:4 or 9:16), the control unit 210 may control the display 290 to display a preview image 610 according to the horizontal length of the display 290 on an upper end of the display 290 regardless of whether the lens 550-1, 550-2, or 550-3 is disposed at a left side or a right side as shown in 600A, 600B, and 600C.

Figure 6A:
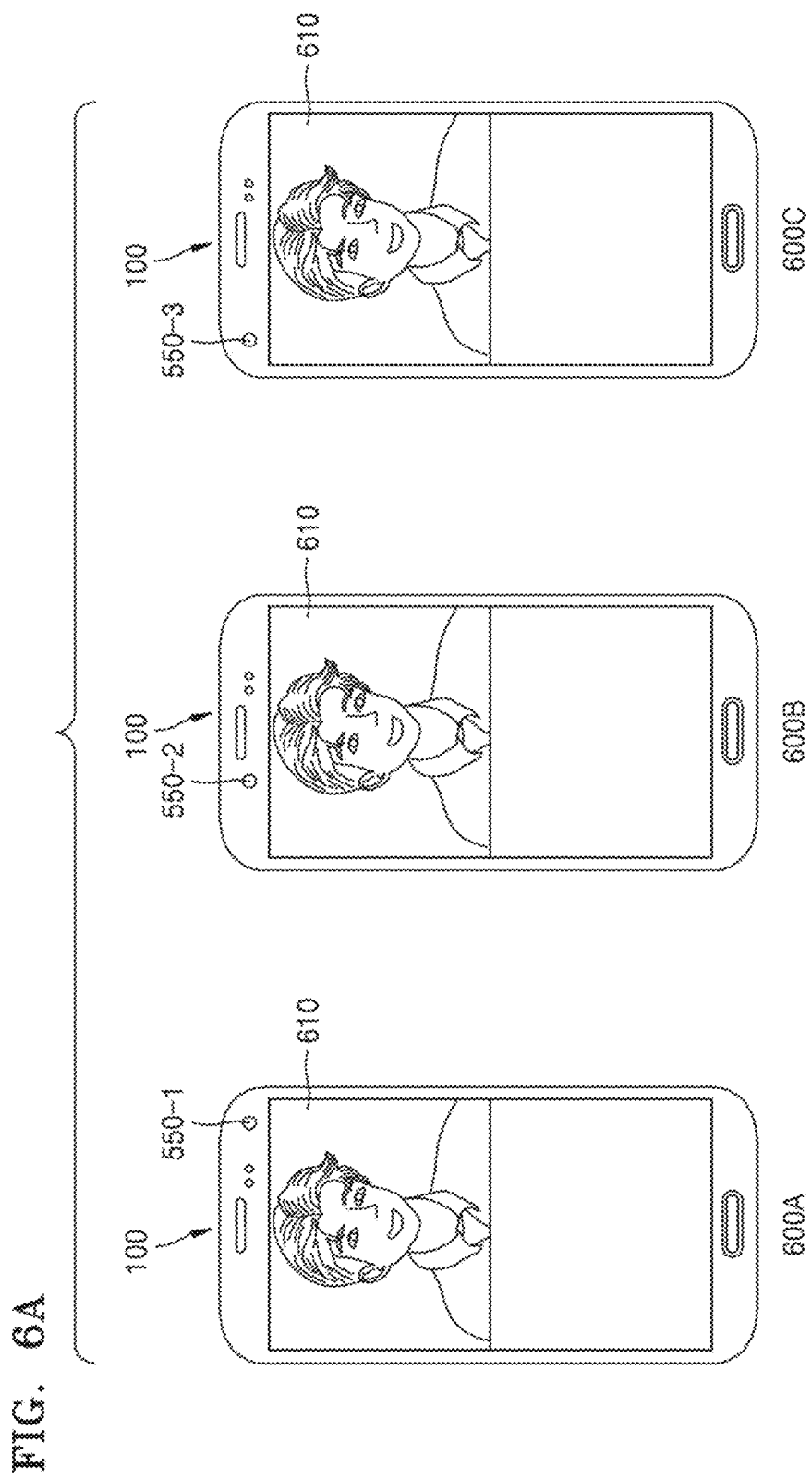
Figure 6B:
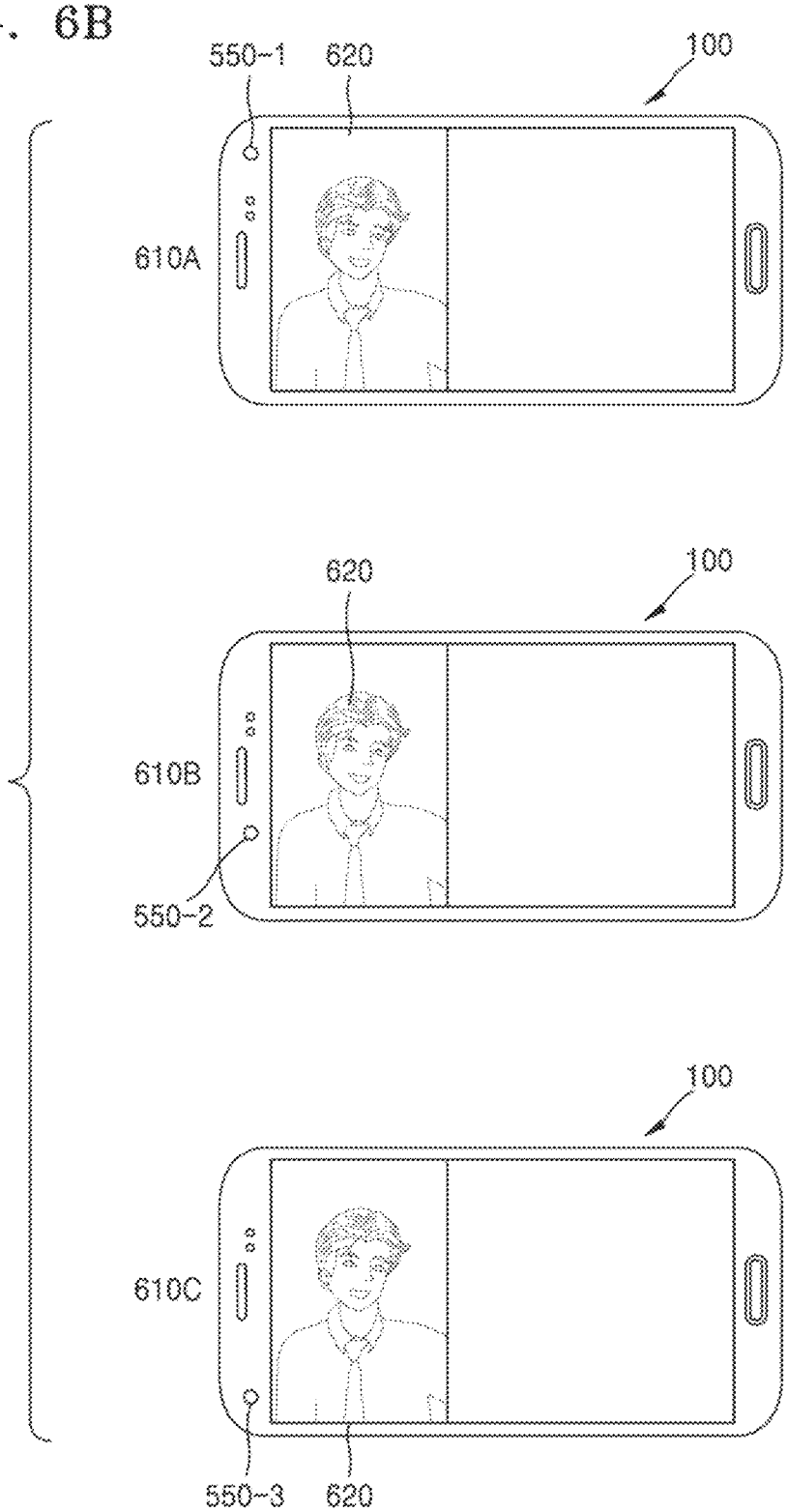

Referring to 610A, 610B, and 610C in FIG. 6B, when a user captures an image while holding the display device 100 in the horizontal direction according to an exemplary embodiment, if a vertical length of the image is longer than a horizontal length of the image (e.g., vertical length:horizontal length is 4:3 or 16:9), the control unit 210 may control the display 290 to display a preview image 620 according to the vertical length of the display 290 on a left side of the display 290 regardless of whether the lens 550-1, 550-2, or 550-3 is disposed on an upper end or a lower end.

Figure 7:
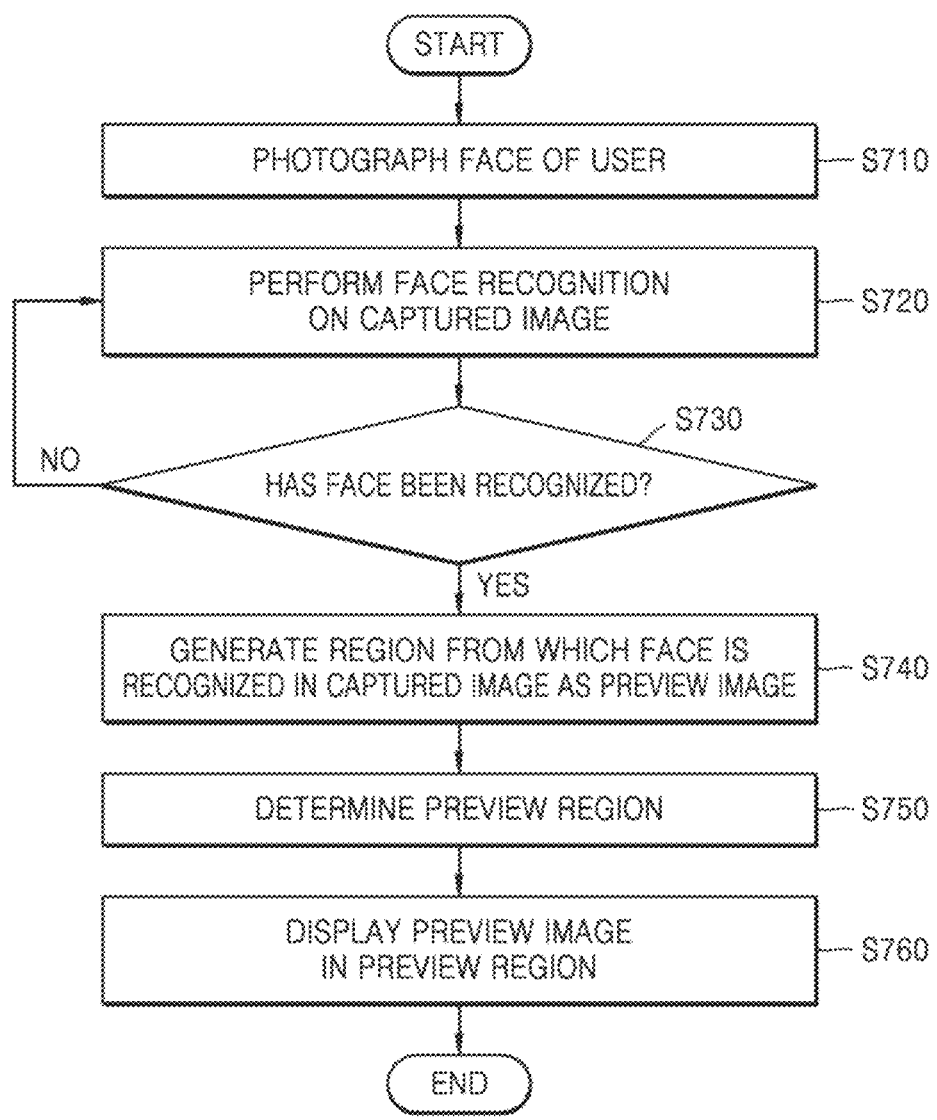
FIG. 7 illustrates a flowchart of a process in which the display device displays a preview image, according to another exemplary embodiment.

FIG. 7 illustrates a flowchart of a process in which the display device 100 displays a preview image, according to another exemplary embodiment.

In operation S710, the display device 100 may photograph a face of a user by using the image sensor 250 of FIG. 2. In operation S720, the display device 100 may execute face recognition on the captured image. The face recognition indicates a process in which a device recognizes a face included in an image. In FIG. 7, although a process in which the display device 100 recognizes the face of the user as an object is illustrated, an object recognized by the display device 100 may vary according to exemplary embodiments.

After executing the face recognition, if the face of the user is not recognized from the image in operation S730, the display device 100 may proceed to operation S720 to execute the face recognition again. Alternatively, the display device 100 may proceed to operation S710 to photograph the face of the user again.

Figure 8:
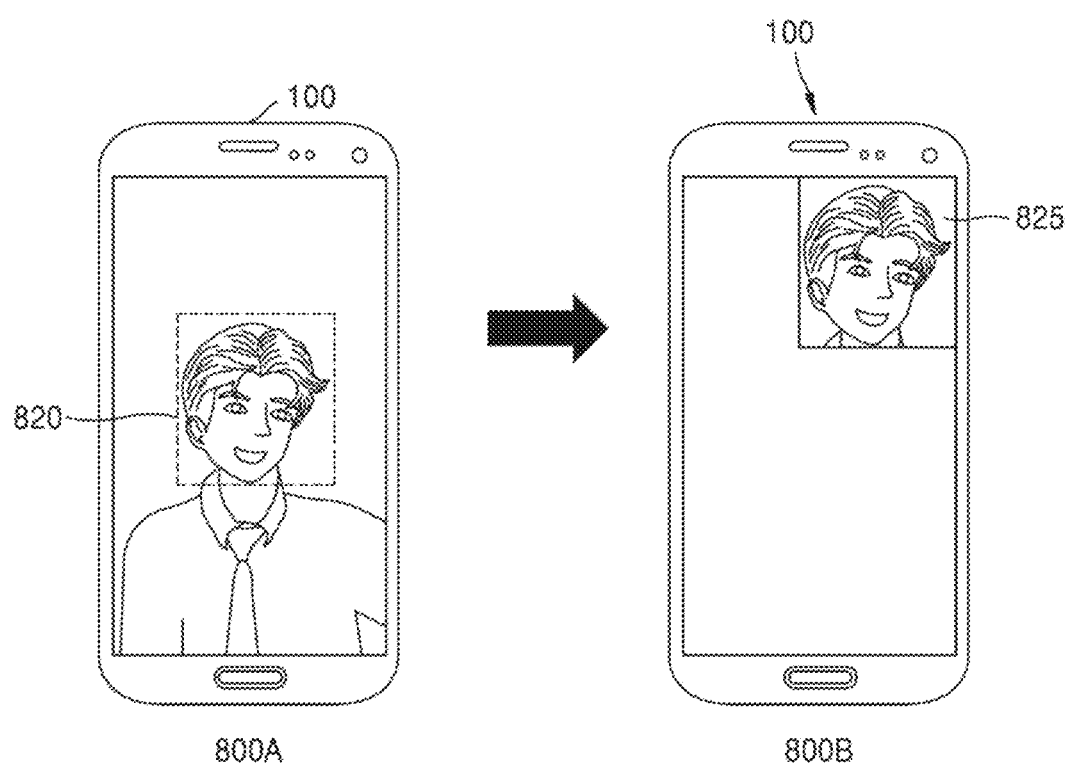
FIG. 8 illustrates a preview image displayed by the display device.

If the face of the user is recognized from the image in operation S730, the control unit 210 of the display device 100 may generate a region from which the face is recognized in the image as a preview image in operation S740. FIG. 8 illustrates a preview image 825 displayed by the display device 100. Referring to FIG. 8, the display device 100 may generate a region 820 in which a face is included in a whole image shown in 800A as the preview image 825 as shown in 800B. Herein, the whole image generated using an image sensor may be referred to as "unprocessed image". That is, the display device 100 may generate a region including a face of a user, which is an object recognized from an unprocessed image, as a preview image.

In operation S750, the display device 100 may determine a preview region. Operation S750 may be similar to operation S320 of FIG. 3. In operation S760, the display device 100 may display the preview image in the determined preview region. Operation S760 may be similar to operation S330 of FIG. 3.

Figure 9:
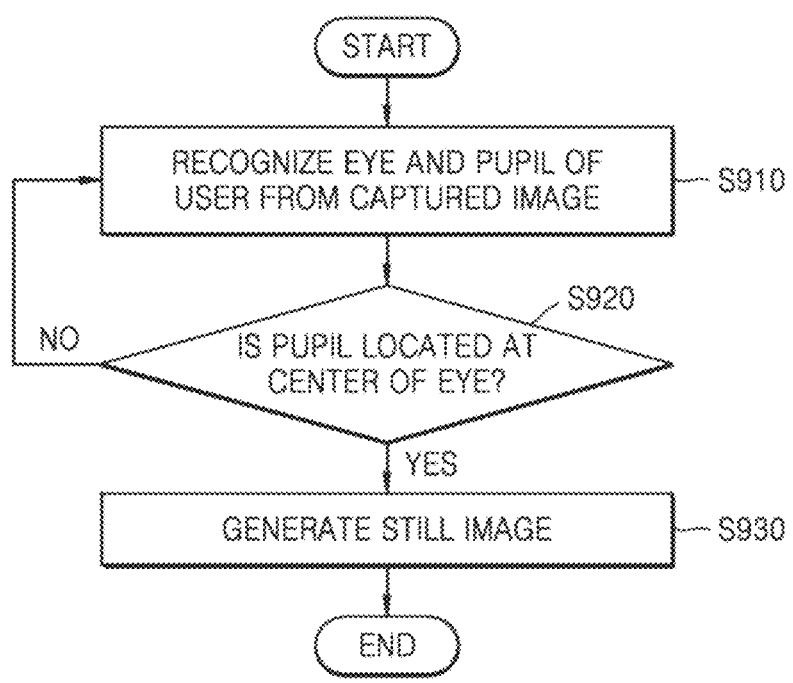
FIG. 9 illustrates a flowchart of a process in which the display device captures an image, according to an exemplary embodiment.
Figure 10A:
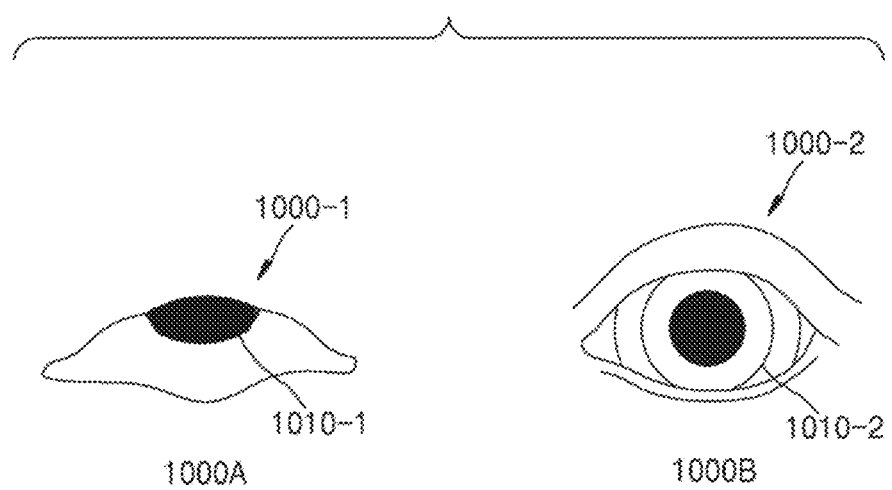
FIG. 10A illustrates an example for describing a method by which the display device determines an image capturing time point by using pupil recognition, according to an exemplary embodiment.

FIG. 9 illustrates a flowchart of a process in which the display device 100 captures an image, according to an exemplary embodiment. In addition, FIG. 10A illustrates an example for describing a method by which the display device 100 determines an image capturing time point by using pupil recognition, according to an exemplary embodiment.

In operation S910, the display device 100 may capture an image by using the image sensor 250 and recognize an eye and a pupil of a user from the captured image. In operation S920, the display device 100 may determine whether the pupil is located at the center of the eye. For example, the control unit 210 may determine whether the pupil is located at the center of the eye, based on a result of comparing a width of the white of the eye, which is located above the pupil in the eye, with a width of the white of the eye, which is located below the pupil. Referring to 1000A, since a width of the white of the eye, which is located below a pupil 1010-1 in an eye 1000-1, is wider than a width of the white of the eye, which is located above the pupil 1010-1, and thus, the control unit 210 may be determined that the pupil 1010-1 is not located at the center of the eye 1000-1. This may indicate that a user gazes at a point other than a lens of a camera. In this case, the display device 100 may proceed to operation S910 to monitor a location of the pupil in the eye.

As shown in 1000B, if it is determined that a pupil 1010-2 is located at the center of an eye 1000-2, the display device 100 may generate a still image in operation S930. According to an exemplary embodiment, in operation S930, the display device 100 may generate a still image after informing the user of an appropriate time point for capturing by outputting an alarm sound, an icon, or the like. According to another exemplary embodiment, the display device 100 may generate a still image immediately when the pupil of the user is located at the center of the eye.

Figure 10B:
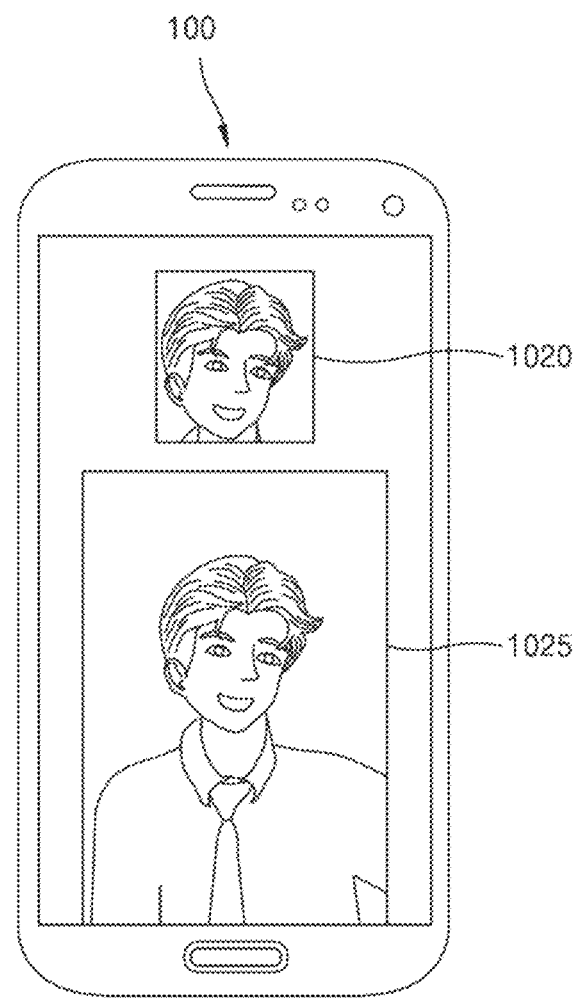
FIG. 10B illustrates an example in which the display device displays a still image, according to an exemplary embodiment.

FIG. 10B illustrates an example in which the display device 100 displays a still image, according to an exemplary embodiment.

As shown in FIG. 10B, when the control unit 210 provides the still image generated in operation S930 of FIG. 9 to the display 290, the control unit 210 may display both an image 1020 of a region including a face from among a whole image 1025 and the whole image 1025 on the display 290.

According to an exemplary embodiment, the control unit 210 may store at least one selected image in the storage unit 175 of FIG. 1 based on a user input for selecting at least one of the image 1020 of the region including the face from among the whole image 1025 and the whole image 1025.

FIG. 10B illustrates an embodiment in which the display device 100 displays a still image, but the present embodiment is not limited thereto.

Figure 11:
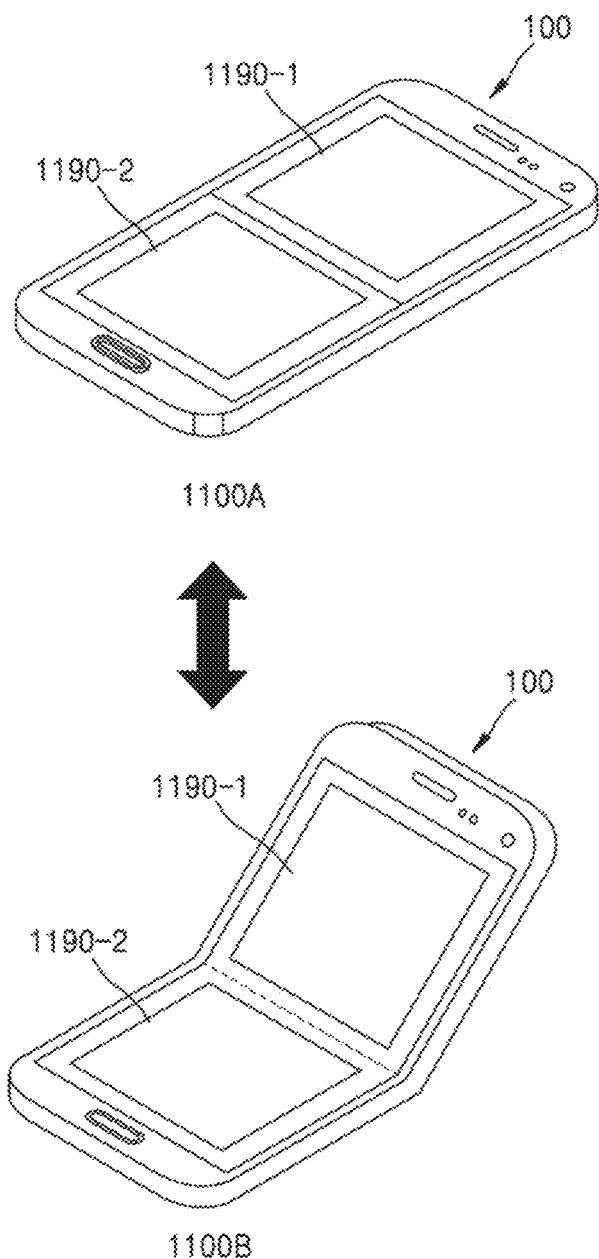
FIG. 11 illustrates a structure of the display device, according to an exemplary embodiment.

FIG. 11 illustrates a structure of the display device 100, according to an exemplary embodiment.

According to the present embodiment, the display device 100 may include a plurality of displays to perform a bending motion. Referring to 1100A, the display device 100 may include a first display 1190-1 and a second display 1190-2. Referring to 1100B, the display device 100 may perform a bending motion by including a hinge or the like between the first display 1190-1 and the second display 1190-2.

Figure 12:
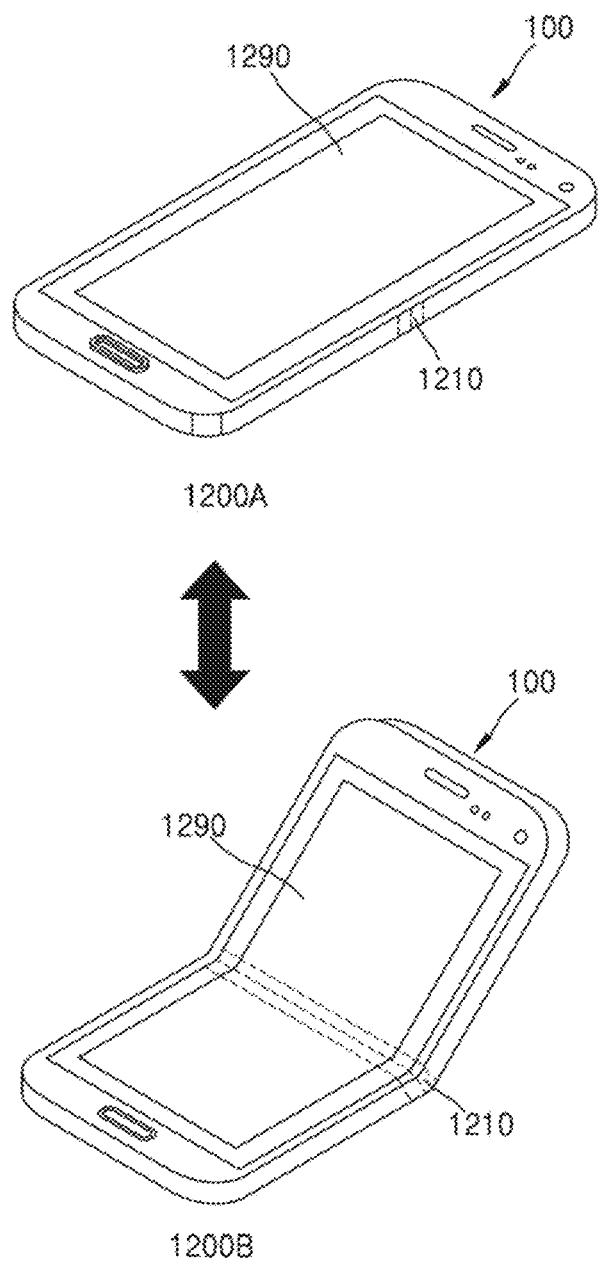
FIG. 12 illustrates a structure of the display device, according to another exemplary embodiment.

FIG. 12 illustrates a structure of the display device 100, according to another exemplary embodiment.

Referring to 1200A, the display device 100 may include a flexible display 1290 and a bending part 1210 to perform a bending motion. The bending part 1210 has a hinge or the like to allow a user to bend the display device 100. When the display device 100 is bent, the flexible display 1290 may also be bent (1200B).

The display devices 100 shown in FIGS. 11 and 12 are only illustrative for convenience of description, and a shape of the display device 100 may be variously modified according to exemplary embodiments.

Figure 13:
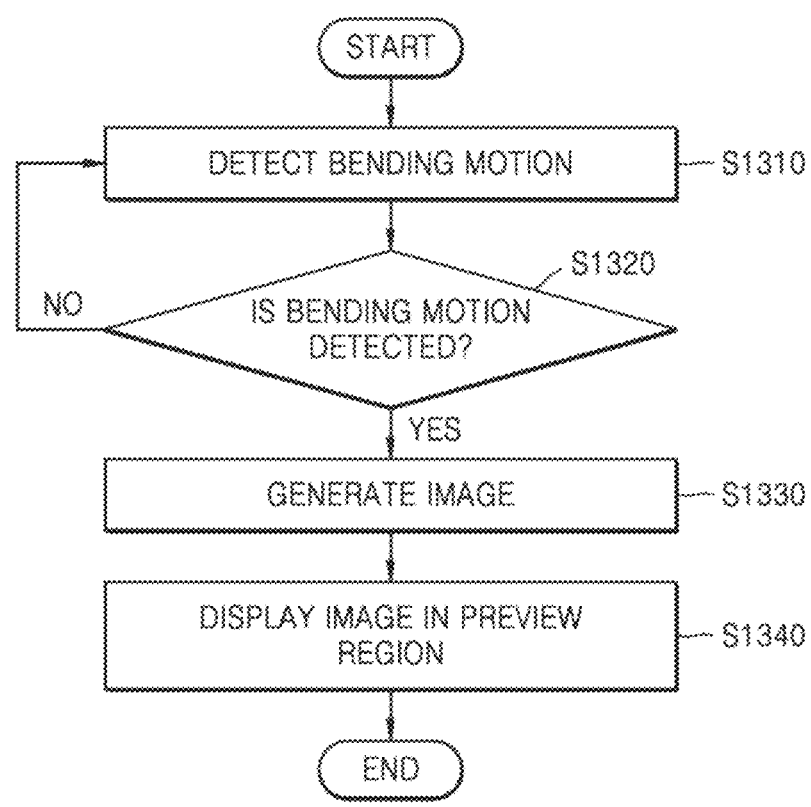
FIG. 13 illustrates a flowchart of a process in which the display device displays a preview image, according to another exemplary embodiment.

FIG. 13 illustrates a flowchart of a process in which the display device 100 displays a preview image, according to another exemplary embodiment.

In operation S1310, the display device 100 may detect a bending motion or a bent state of the display device 100 by using the bending detection sensor 270. When the bending motion or a bent state is detected in operation S1320, the display device 100 may generate an image to be displayed in operation S1330. The image to be displayed may be a preview image.

In operation S1340, the display device 100 may determine a region in which an image is to be displayed and display the generated image in the determined region. When the displayed image is a preview image, the determined region may be a preview region.

Figure 14:
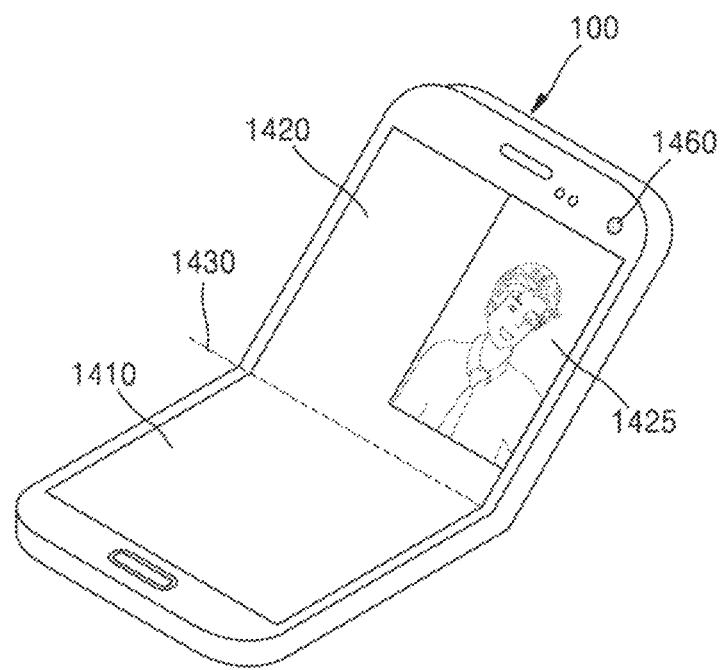
FIG. 14 illustrates a region in which a preview image is displayed, according to one or more exemplary embodiments.

FIG. 14 illustrates a region in which a preview image is displayed, according to one or more exemplary embodiments.

When the display device 100 is bent, a display of the display device 100 may be divided into a first region 1410 and a second region 1420 based on a bending line 1430. The bending line 1430 may indicate a line defining a location at which a bending motion is performed. The display device 100 may determine a preview region such that the preview region is included in a region close to a location at which a lens 1460 is disposed from among the first region 1410 and the second region 1420. In one exemplary embodiment, the bending line is a visible line that is displayed by the display device 100. In another exemplary embodiment, the bending line is not a visible line and is not displayed by the display device 100.

According to an exemplary embodiment, the display device 100 may display an image 1425 in the entire first region 1410 or second region 1420. According to another exemplary embodiment, the display device 100 may display the image 1425 in a partial region of the second region 1420, which is close to the location at which the lens 1460 is disposed, as shown in FIG. 14.

Figure 15A:
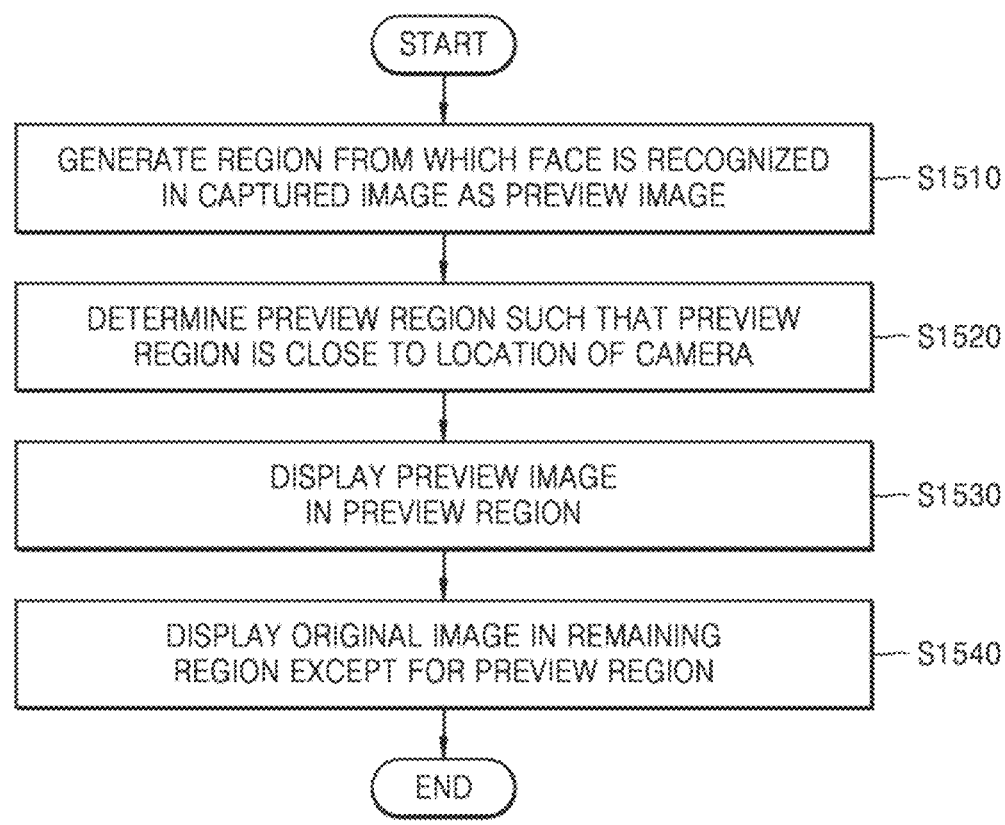
FIG. 15A illustrates a flowchart of a method in which the display device displays a preview image, according to one or more other exemplary embodiments.

FIG. 15A illustrates a flowchart of a method in which the display device 100 displays a preview image, according to one or more other exemplary embodiments.

In operation S1510, the display device 100 may generate a region from which a face is recognized in a captured image as a preview image. Operation S1510 may be similar to operation S740 of FIG. 7.

In operation S1520, the display device 100 may determine a preview region such that the preview region is close to a location of a camera. Operation S1520 may be similar to operation S750 of FIG. 7. According to an exemplary embodiment, the display device 100 may determine a partial region of the whole region of the display 290, which is close to a location at which a lens of a camera is disposed, as the preview region based on the location at which the lens of the camera is disposed.

In operation S1530, the display device 100 may display the preview image in the preview region. Operation S1530 may be similar to operation S760 of FIG. 7. According to an exemplary embodiment, the display device 100 may display the preview image generated in operation S1510 in the preview region determined in operation S1520.

In operation S1540, the display device 100 may display an original image in a remaining region except for the preview region among the whole region of the display 290. In an exemplary embodiment, the remaining region is outside of the preview region.

In yet another exemplary embodiment, the remaining region is not overlapping with the preview region.

In one exemplary embodiment, the remaining region is partially overlapping with the preview regions.

Figure 15B:
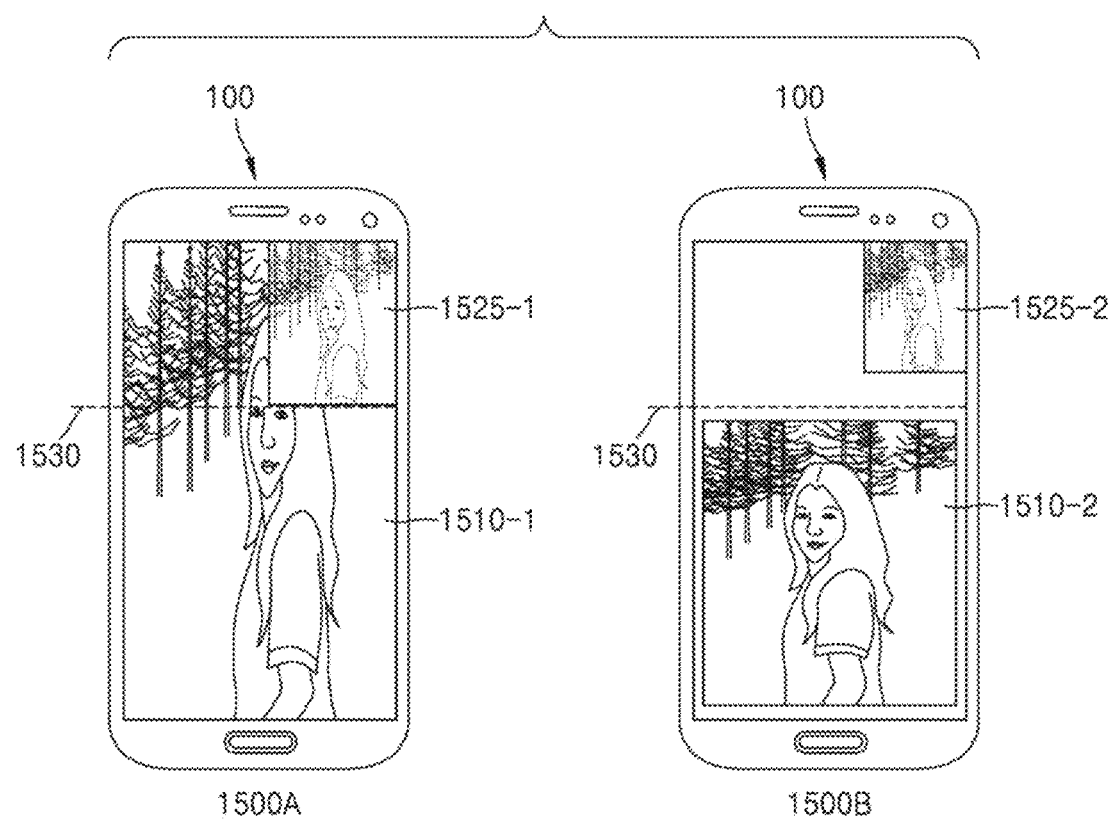
FIG. 15B illustrates the method in which the display device displays a preview image, according to one or more other exemplary embodiments.

FIG. 15B illustrates the method in which the display device 100 displays a preview image, according to one or more other exemplary embodiments.

According to an exemplary embodiment, in addition to the preview region determined in operation S1340 of FIG.

13, the display device 100 may display a separate preview image in a region except for the preview region on the display 290.

Referring to 1500A, the display device 100 may display a preview image 1525-1 in an upper region of a bending line 1530 and further display a separate preview image 1510-1 in the entire region except for the region in which the preview image 1525-1 is displayed. Alternatively, referring to 1500B, the display device 100 may display a preview image 1525-2 in the upper region of the bending line 1530 and further display a separate preview image 1510-2 in a lower region of the bending line 1530.

Figure 16A:
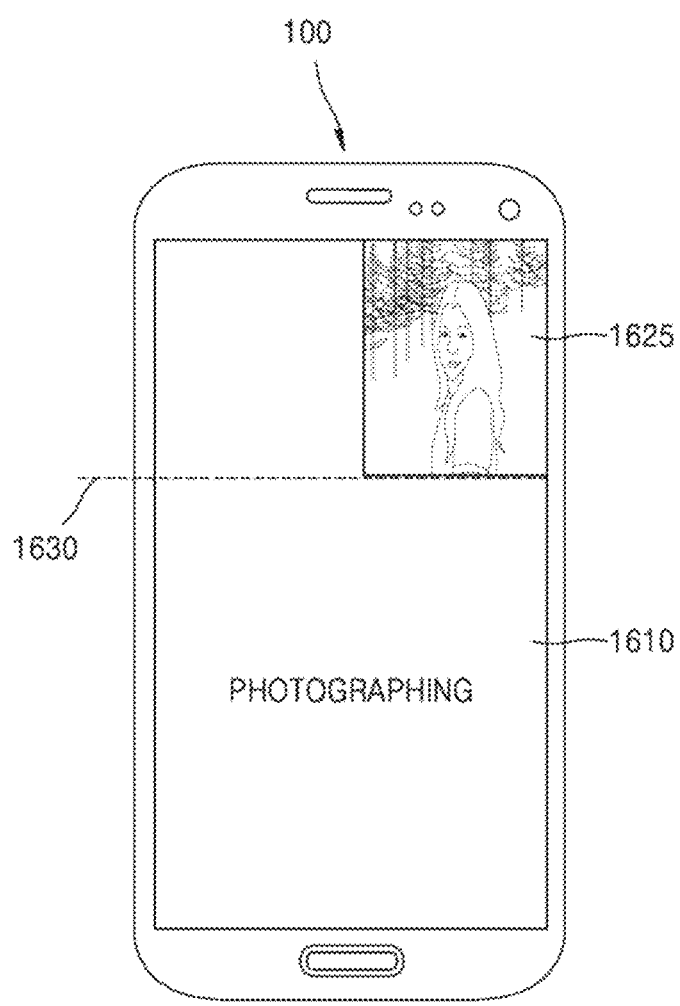
FIGS. 16A and 16B illustrate the method in which the display device displays a preview image, according to one or more other exemplary embodiments.
Figure 16B:
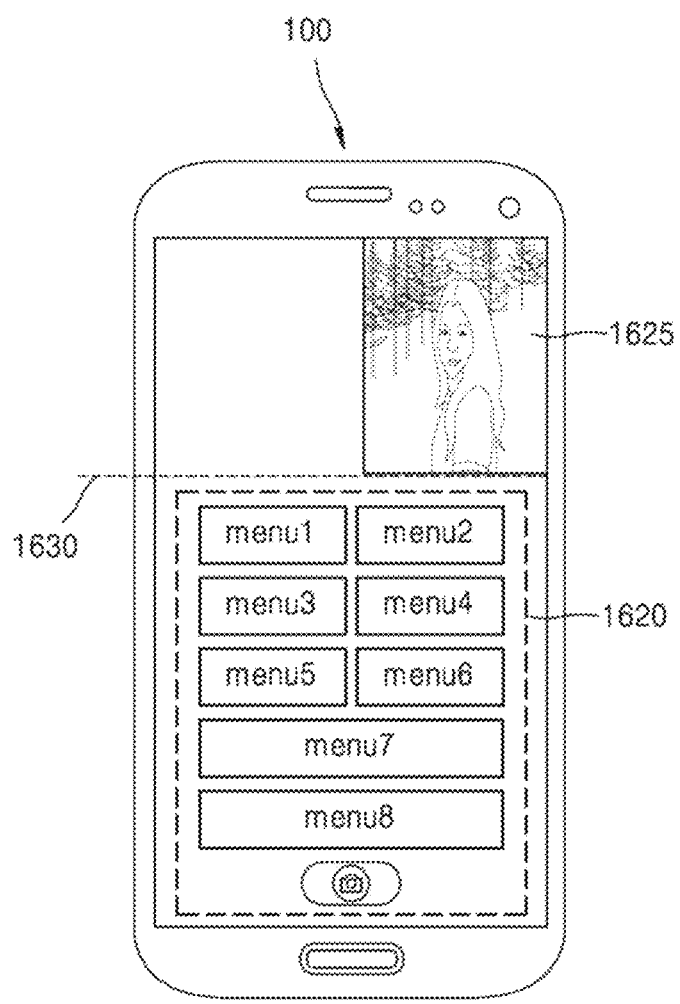

FIGS. 16A and 16B illustrate the method in which the display device 100 displays a preview image, according to one or more other exemplary embodiments.

Referring to FIG. 16A, the display device 100 may display a preview image 1625 in an upper region of a bending line 1630. The display device 100 may receive a touch input through a region 1610 of a display except for the region in which the preview image 1625 is displayed. According to the present embodiment, the display may include a touch screen. When a touch input is received through the region 1610 of the display, the display device 100 may generate a still image. That is, the display device 100 may use the region 1610 in which the preview image 1625 is not displayed as a user interface for an image capturing command input.

Referring to FIG. 16B, the display device 100 may display the preview image 1625 in the upper region of the bending line 1630. The display device 100 may provide camera related menus to a region 1620 of the display except for the region in which the preview image 1625 is displayed. Accordingly, a user may have high accessibility to the camera related menus while viewing the preview image 1625.

Figure 17:
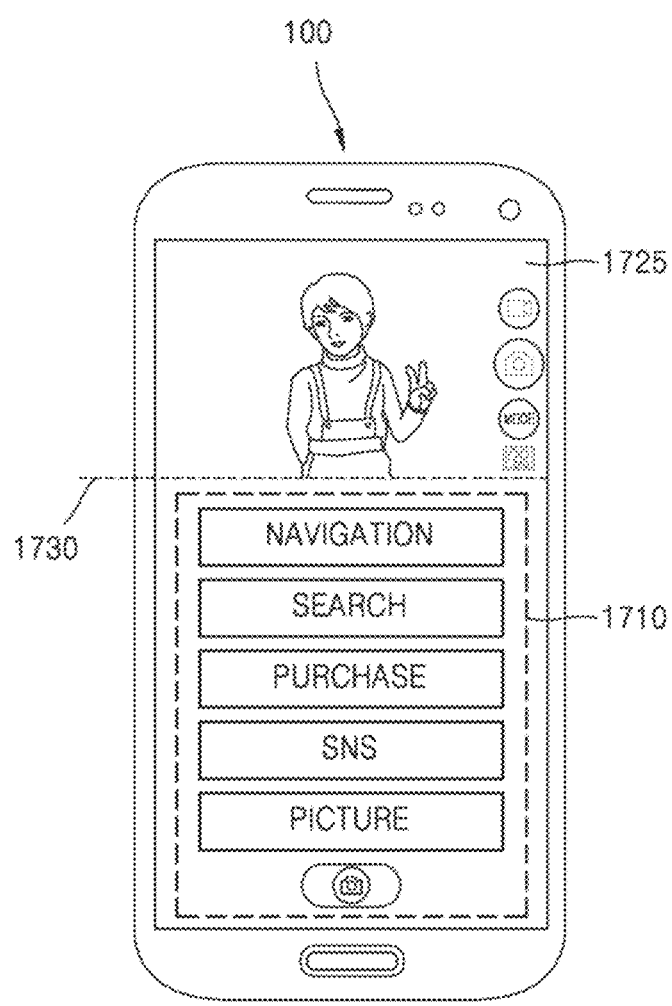
FIGS. 17 through 19 illustrate the method in which the display device displays a preview image, according to one or more other exemplary embodiments.
Figure 18:
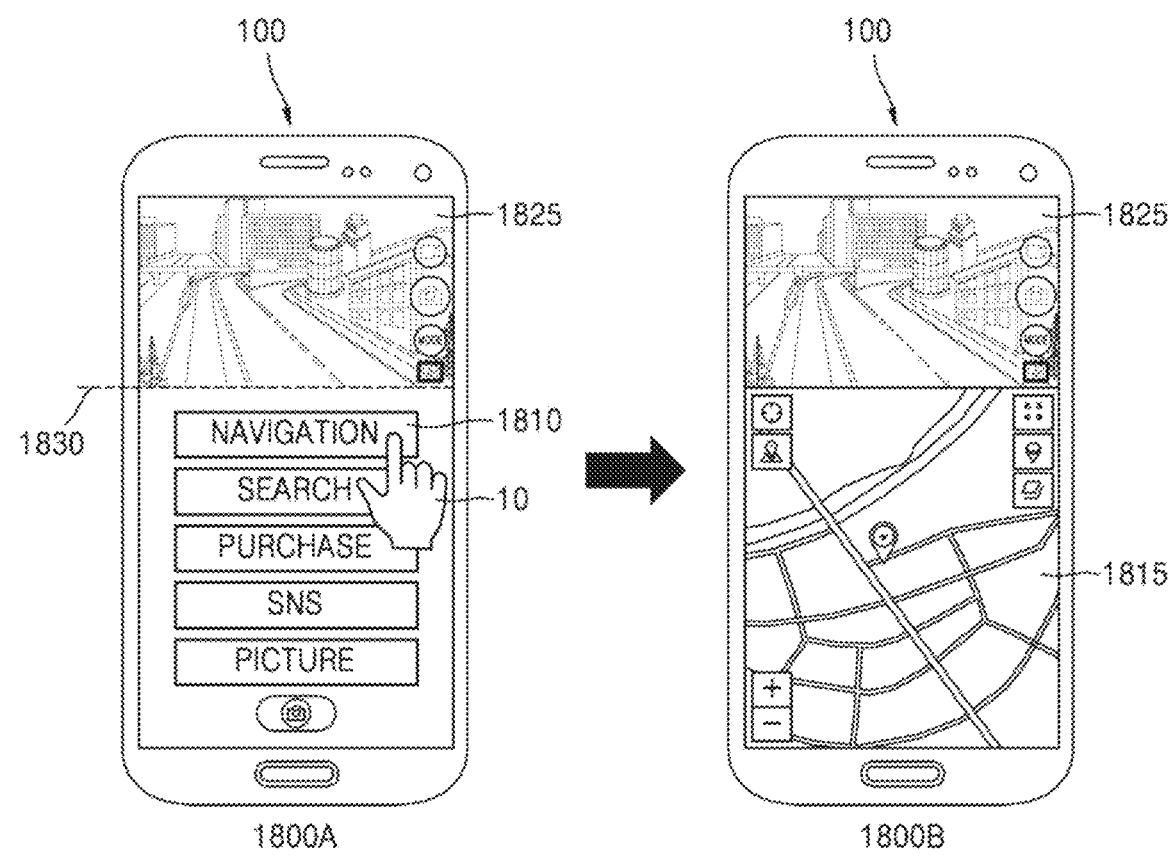
Figure 19:
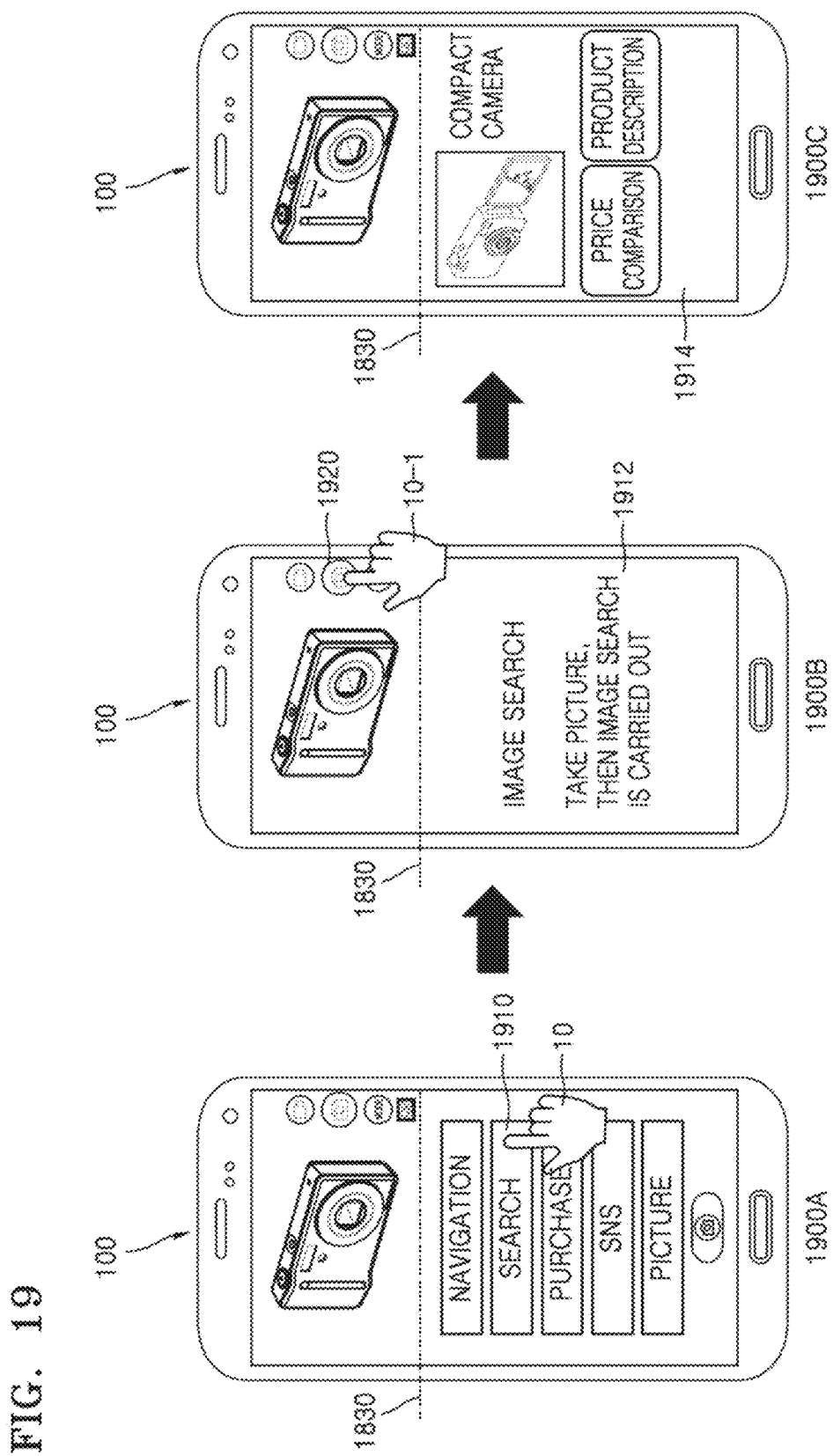

FIGS. 17 through 19 illustrate the method in which the display device 100 displays a preview image, according to one or more other exemplary embodiments.

Referring to FIG. 17, the display device 100 may display a preview image 1725 in one region divided based on a bending line 1730. In addition, the display device 100 may display a user interface 1710 for using services of the display device 100 in the other region.

For example, referring to FIG. 18, the display device 100 may display a user interface object 1810 for using a navigation service. As shown in FIG. 18, the display device 100 may display a preview image 1825 and the user interface object 1810 in respective regions divided based on a bending line 1830. As shown in 1800A, when the user 10 selects the user interface object 1810, the display device 100 may search for a position of the display device 100. The display device 100 may display both an execution screen image 1815 of an application for providing a navigation service and the preview image 1825 to which augmented reality is applied, based on the searched position (1800B). Herein, the preview image 1825 to which augmented reality is applied may indicate an image displayed by overlapping with information about a photographed building and the like.

As another example, referring to FIG. 19, the display device 100 may display a user interface object 1910 for providing a search service using image capturing. Referring to 1900A, the user 10 may select the user interface object 1910 displayed at a lower part of the bending line 1830. Referring to 1900B, when the user interface object 1910 is selected, the display device 100 may display information 1912 indicating that an image search is carried out if an image is captured. If a user 10-1 selects an image capturing button 1920, the display device 100 may captures an image and performs a search by using the captured image. Referring to 1900C, the display device 100 may display information 1914, which has been searched using the image, at the lower part of the bending line 1830.

User interfaces for using services of the display device 100 may be variously modified according to exemplary embodiments. For example, the user interfaces for using services of the display device 100 may include a user interface for purchasing a product related to a corresponding image after capturing the image, a user interface for uploading a captured image to a social network service (SNS), a user interface for setting a detailed configuration for capturing an image, and the like.

Figure 20:
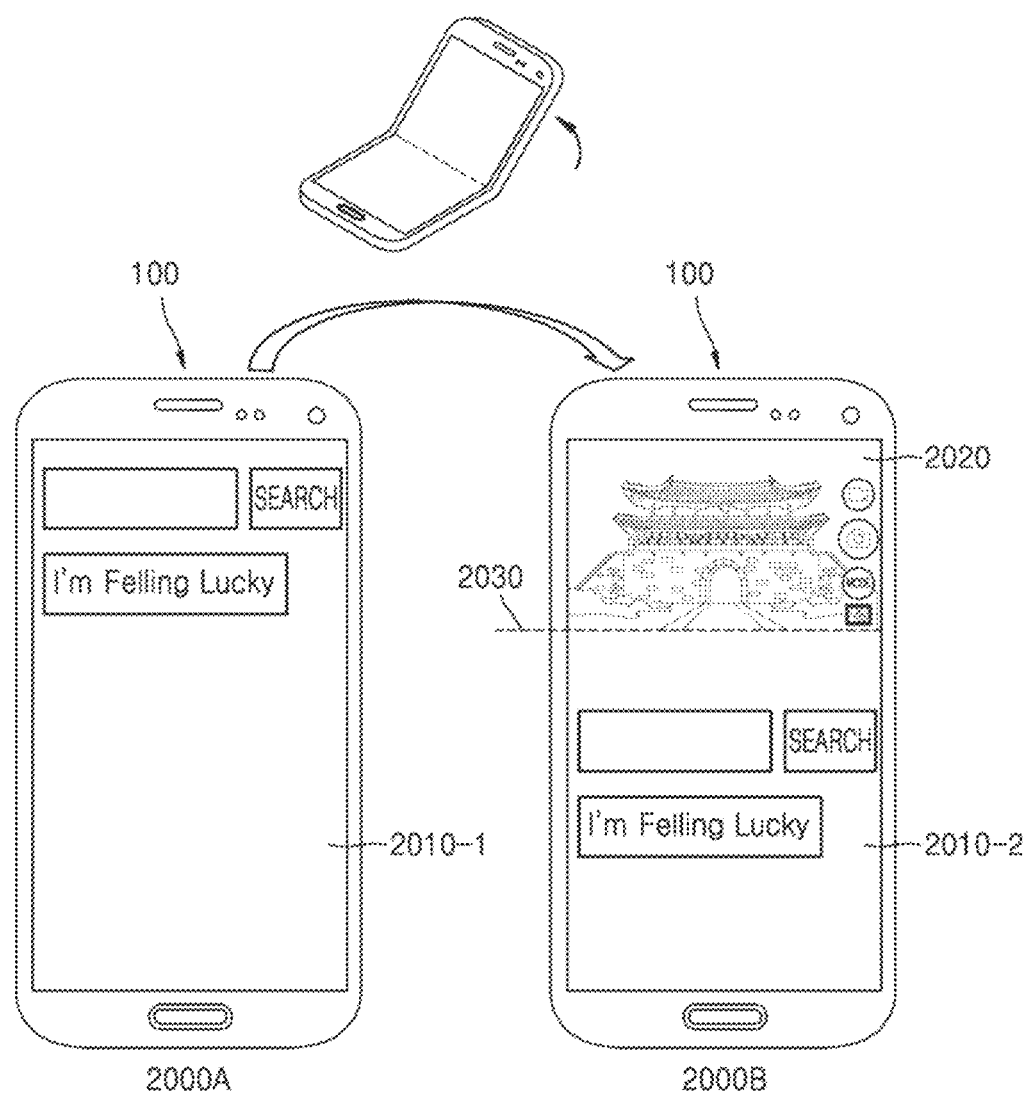
FIG. 20 illustrates the method in which the display device displays a preview image, according to one or more other exemplary embodiments.

FIG. 20 illustrates the method in which the display device 100 displays a preview image, according to one or more other exemplary embodiments.

When a bending motion or a bent state is detected, the display device 100 which is bendable may determine a screen image to be displayed in each of regions divided based on a bending line 2030 according to a state of the display device 100 before the bending motion. According to an exemplary embodiment, when a bending motion or a bent state is detected, the display device 100 may determine a screen image to be displayed in each of the regions divided based on the bending line 2030 according to an application being executed by the display device 100. For example, as shown in 2000A, the display device 100 may display an execution screen image 2010-1 of a search application. In this case, when the display device 100 detects a bending motion or a bent state, the display device 100 may display an execution screen image 2010-2 of the search application in a lower region of the bending line 2030 and display an execution screen image 2020 of an image capturing application for an image search in an upper region of the bending line 2030 (2000B). Screen images to be displayed after a bending motion or a bent state based on states of the display device 100 before the bending motion or a bent state may be variously modified according to exemplary embodiments.

Figure 21:
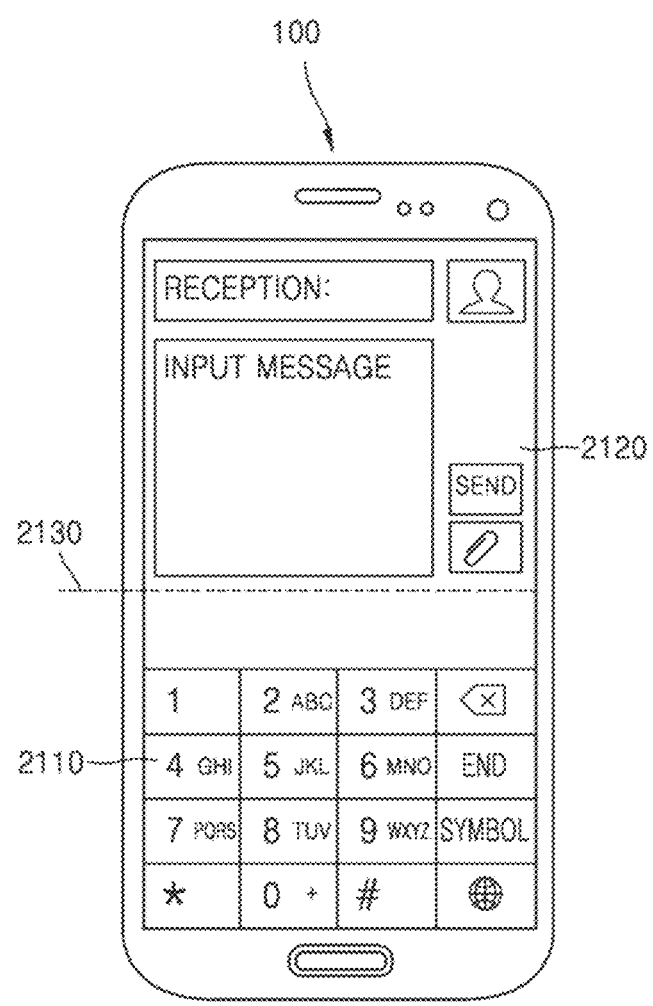
FIGS. 21 and 22 illustrate a method in which the display device displays a user interface, according to an exemplary embodiment.
Figure 22:
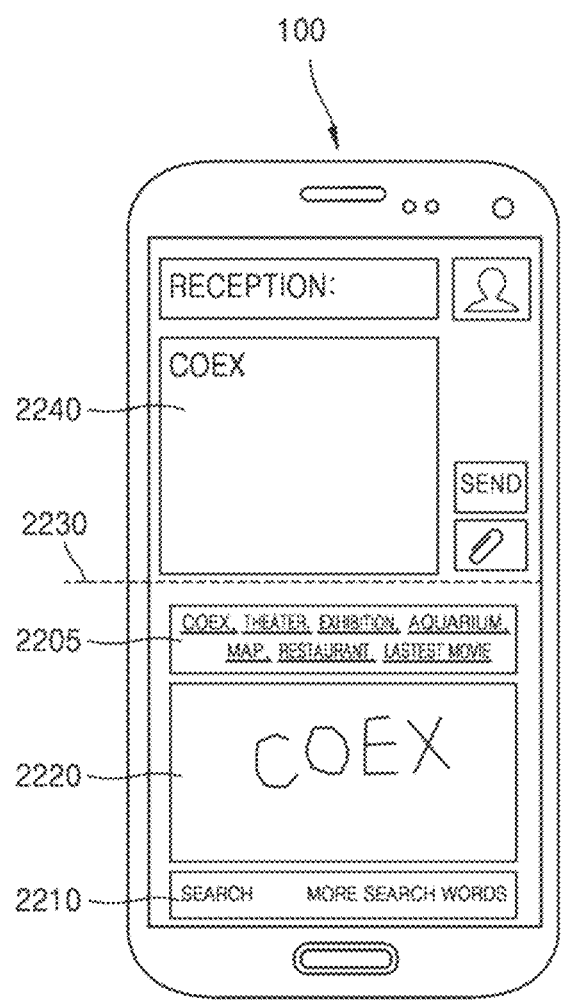
Figure 23:
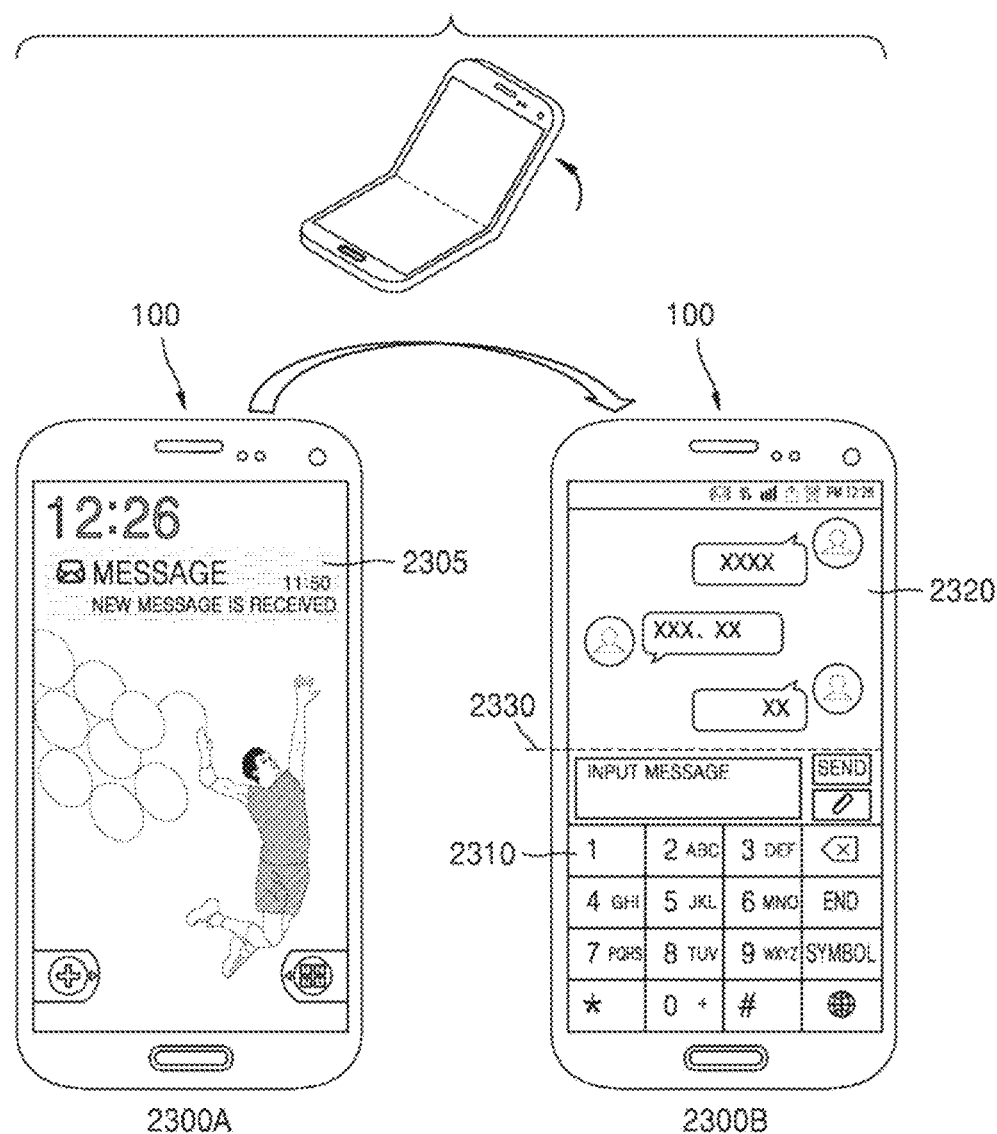
FIGS. 23 through 27 illustrate a method in which the display device displays a user interface when a bending motion is detected, according to an exemplary embodiment.
Figure 24:
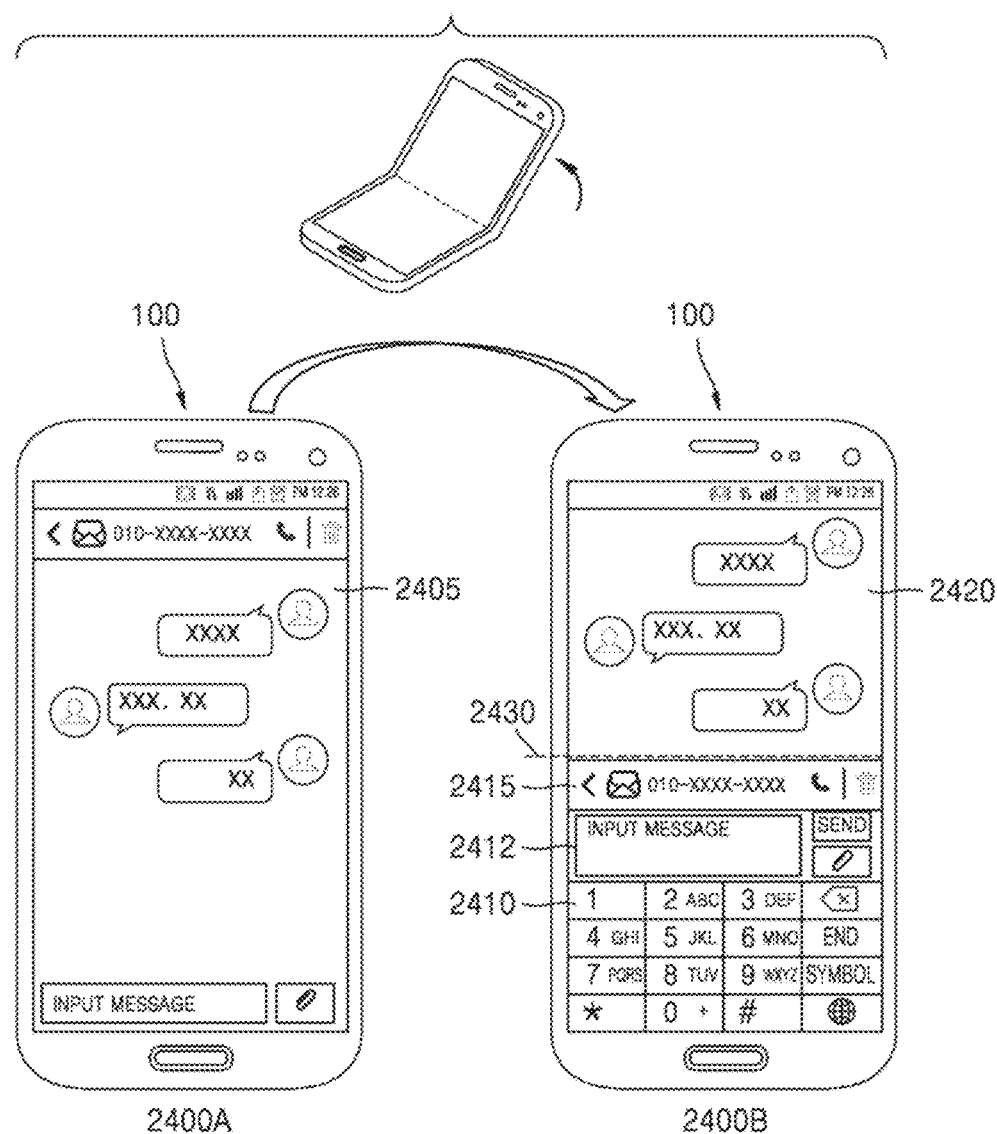
Figure 25:
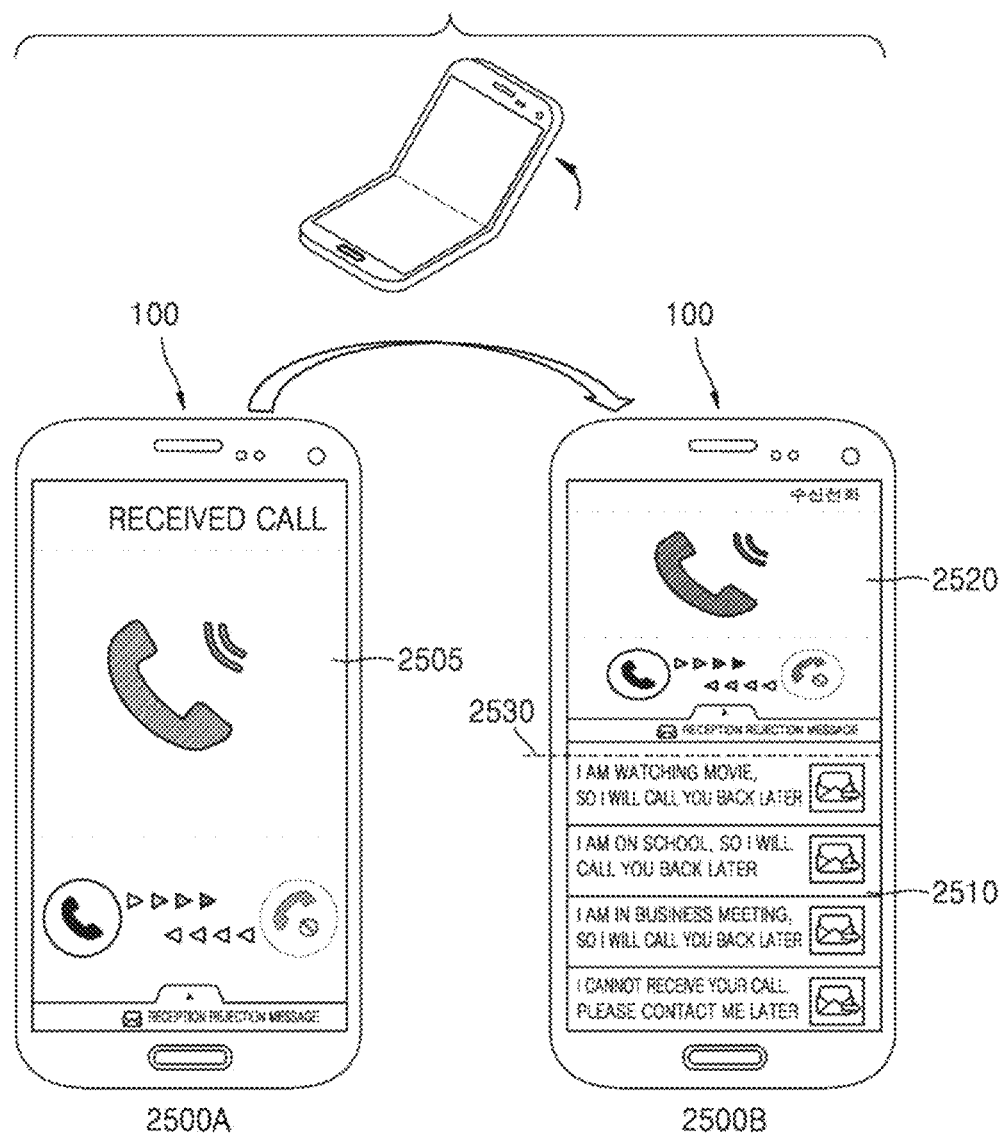
Figure 26:
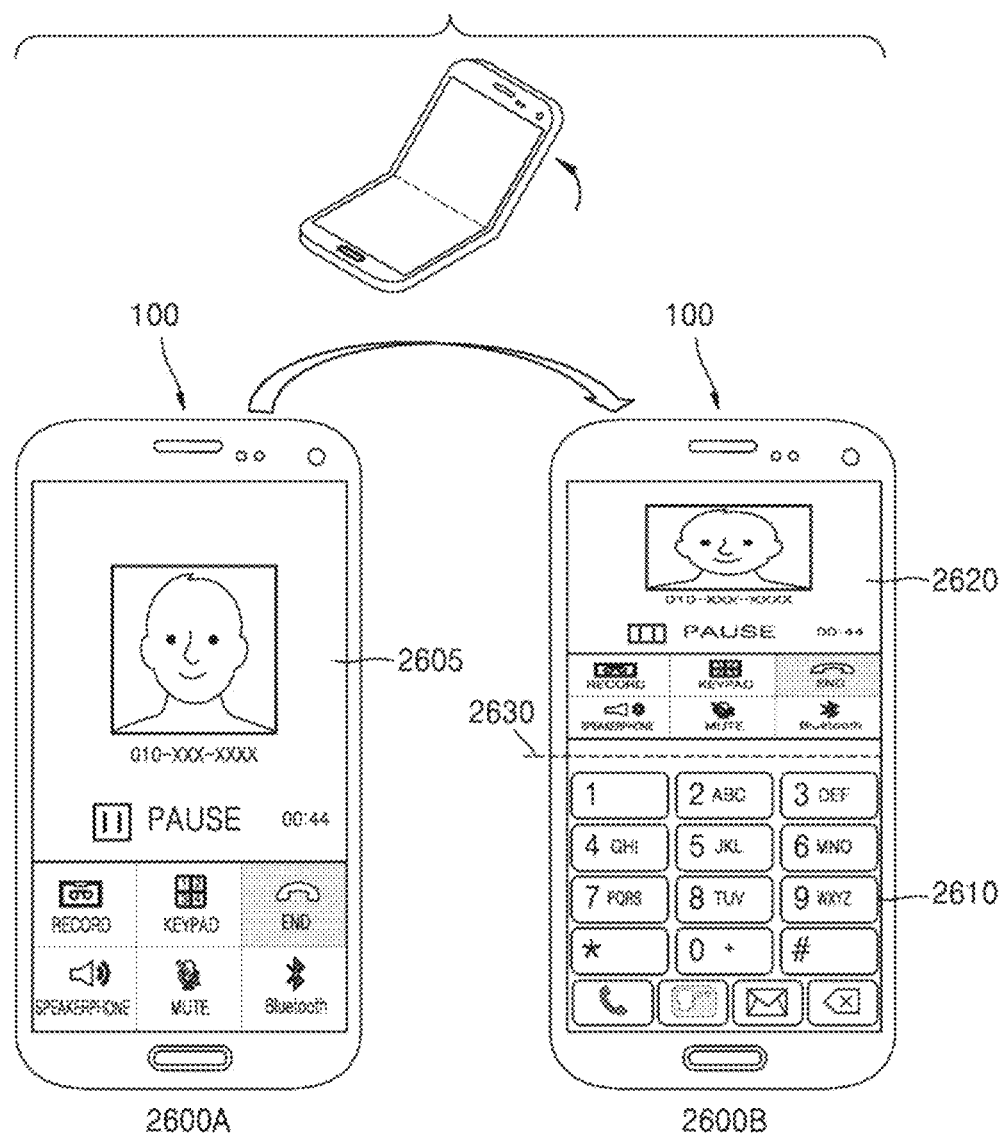
Figure 27:
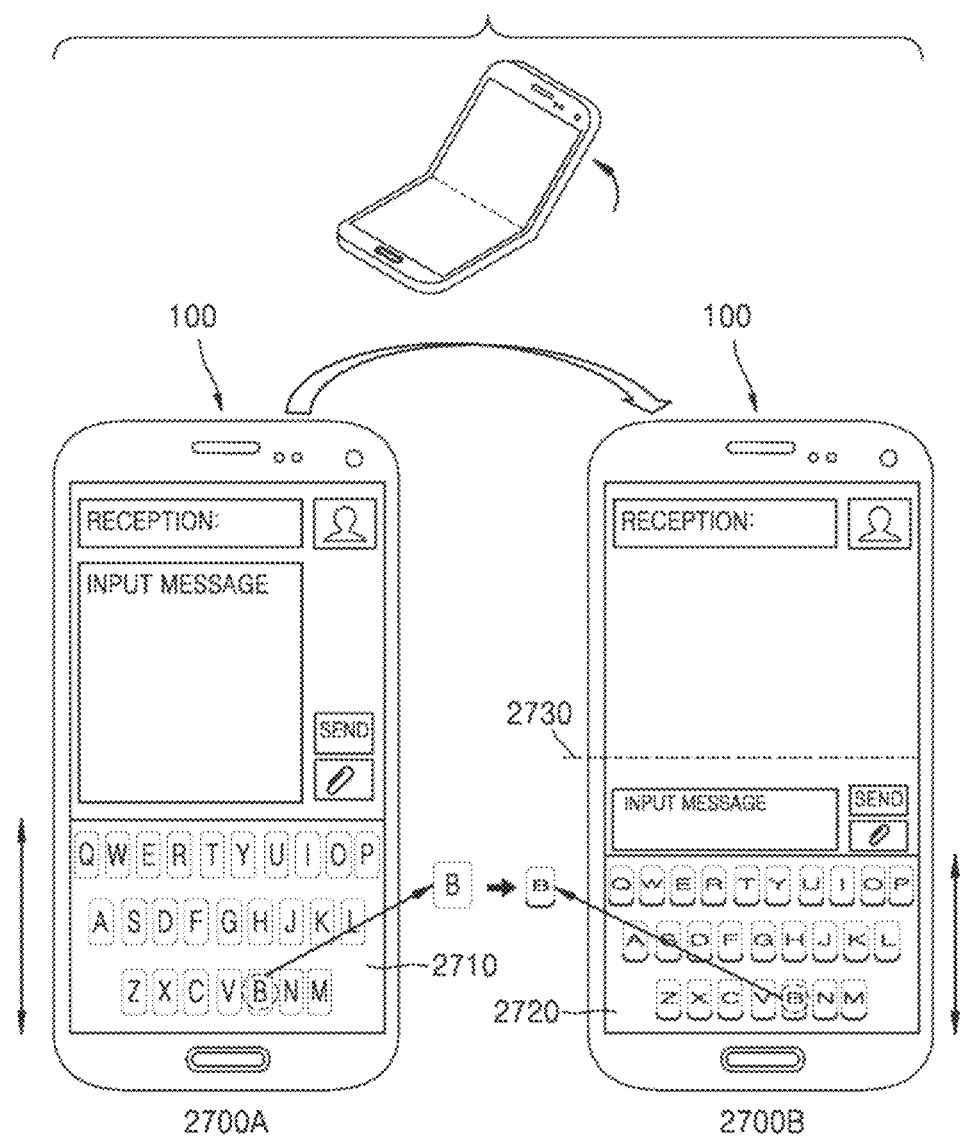

FIGS. 21 and 22 illustrate a method in which the display device 100 displays a user interface, according to an exemplary embodiment.

In the specification, although it has been mainly described that the display device 100 displays a preview image, the preview image is only illustrative, and the preview image may be replaced by another image.

Referring to FIG. 21, the display device 100 may display a message input screen image 2120 which is a user interface through which an inputted message is checked, in one of regions divided based on a bending line 2130. In addition, the display device 100 may display a virtual keypad 2110, which is a user interface for inputting characters and the like, in the other region. When the display device 100 displays a screen image as shown in FIG. 21, a user may look at the message input screen image 2120 at an easy screen checking angle in a state of holding the region in which the virtual keypad 2110 is displayed. FIG. 21 is only an illustration provided for convenience of description, and a screen image displayed by the display device 100 may be variously modified according to exemplary embodiments. For example, the virtual keypad 2110 may be replaced by a handwriting input window for receiving a handwriting input using a stylus pen or the like. As another example, the display device 100 may further display a region for providing a related search function using a word inputted in the region in which the virtual keypad 2110 is displayed and a tool set related to a search.

Referring to FIG. 22, the display device 100 may display a message input screen image 2240, which is a user interface through which an inputted message is checked, in one of regions divided based on a bending line 2230. In addition, the display device 100 may display a handwriting input window 2220 for receiving a handwriting input using a stylus pen or the like, in the other region of the regions divided based on the bending line 2230.

In addition, the display device 100 may display a region 2205 through which the related search function using a word inputted in the handwriting input window 2220 is provided, in a partial region of the regions divided based on the bending line 2230. The region 2205 through which the related search function is provided may include a search word including the word inputted in the handwriting input window 2220, and a related search word set related to the word inputted in the handwriting input window 2220. In addition, the display device 100 may display a tool set 2210 related to a search in a partial region of the regions divided based on the bending line 2230.

FIGS. 23 through 27 illustrate a method in which the display device 100 displays a user interface when a bending motion or a bent state is detected, according to an exemplary embodiment.

As shown in 2300A, when a text message is received, the display device 100 may display reception notification information 2305 on the display 290.

In this case, as shown in 2300B, when the display device 100 detects a bending motion or a bent state, the display device 100 may display the received text message in an upper region 2320 of regions divided based on a bending line 2330. In addition, the display device 100 may display a virtual keypad, which is a user interface for inputting characters and the like, in a lower region 2310 of the regions divided based on the bending line 2330.

As shown in 2400A, the display device 100 may display an execution screen image 2405 of a text message application on the display 290.

In this case, as shown in 2400B, when the display device 100 detects a bending motion or a bent state, the display device 100 may display an execution screen image of the text message application in an upper region 2420 of regions divided based on a bending line 2430. The display device 100 may display a virtual keypad 2410, which is a user interface for inputting characters and the like, in a lower region of the regions divided based on the bending line 2430. In addition, the display device 100 may display a message input screen image 2412, which is a user interface for checking an inputted message, in the lower region of the regions divided based on the bending line 2430. In addition, the display device 100 may display a menu set 2415 (e.g., information about a message reception number, an icon for deleting a message, an icon for calling with the message reception number, and the like) related to a text message.

As shown in 2500A, the display device 100 may display a screen image 2505 indicating call reception on the display 290 when a call is received.

In this case, as shown in 2500B, when the display device 100 detects a bending motion or a bent state, the display device 100 may display a call reception screen image 2520 in an upper region of regions divided based on a bending line 2530. In addition, the display device 100 may display a screen image 2510 including a list of reception rejection messages in a lower region of the regions divided based on the bending line 2530.

As shown in 2600A, the display device 100 may display an on-call screen image 2605 on the display 290.

In this case, as shown in 2600B, when the display device 100 detects a bending motion or a bent state, the display device 100 may display an on-call screen image 2620 in an upper region of regions divided based on a bending line 2630. In addition, the display device 100 may display a numeric keypad 2610 for inputting a number during a call in a lower region of the regions divided based on the bending line 2630.

As shown in 2700A, the display device 100 may display a virtual keypad 2710, which is a user interface for inputting characters and the like, on the display 290.

In this case, as shown in 2700B, when the display device 100 detects a bending motion or a bent state, the display device 100 may display a virtual keypad 2720 rearranged by reducing a width in the longitudinal direction of the virtual keypad 2710.

The virtual keypad 2720 may be accurately recognized by the eyes of the user when the display device 100 is bent since the virtual keypad 2720 is displayed so as to be three-dimensionally viewed according to a bending angle of the display device 100.

FIG. 28 illustrates a cover 2801 mountable on the display device 100, according to an exemplary embodiment.

Referring to 2800A, the display device 100 may be bent based on a bending line 2830. FIG. 28(b) illustrates the display device 100 mounted with the cover 2801.

Referring to 2800B, the cover 2801 may include a front part 2810 contacting the front surface of the display device 100 and a back part 2820-1 and 2820-2 contacting the rear surface of the display device 100. For example, the back part 2820-1 and 2820-2 of the cover 2801 may include two regions 2820-1 and 2820-2 contacting two regions of the rear surface of the display device 100, which are divided based on the bending line 2830 (2800C). In addition, a side surface part 2840 of the cover 2801 may include a structure bendable in a state where the cover 2801 is mounted on the display device 100.

FIG. 28 is only illustrative, and the present exemplary embodiment is not limited thereto.

One or more exemplary embodiments may be implemented in a form of a recording medium including computer-executable instructions such as a program module executed by a computer system. A non-transitory computer-readable medium may be an arbitrary available medium which may be accessed by a computer system and includes all types of volatile and non-volatile media and separated and non-separated media. In addition, the non-transitory computer-readable medium may include all types of computer storage media and communication media. The computer storage media include all types of volatile and non-volatile and separated and non-separated media implemented by an arbitrary method or technique for storing information such as computer-readable instructions, a data structure, a program module, or other data. The communication media typically include computer-readable instructions, a data structure, a program module, other data of a modulated signal such as a carrier, other transmission mechanism, and arbitrary information delivery media. For example, the computer storage media may be implemented using ROM, RAM, flash memory, a compact disc (CD), a digital versatile disc (DVD), a magnetic disc, a magnetic tape, and the like.

The embodiments described above are only illustrative, and it will be understood by those of ordinary skill in the art that various changes in form and details may be made therein without changing the technical spirit and mandatory features of the inventive concept. Therefore, the embodiments should be understood in the illustrative sense only and not for the purpose of limitation in all aspects. For example, each component described as a single type may be carried out by being distributed, and likewise, components described as a distributed type may also be carried out by being coupled.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display device comprising:
   a display;
   a camera configured to capture an image;
   a sensor configured to detect a bending motion of the display device; and
   a control unit configured to:
      based on the sensor detecting the bending motion of the display device, control the camera to operate and control the display to display a preview image for capturing the image by operating the camera in a portion of a first area of the display, and
      based on the sensor detecting the bending motion of the display device, control the display to display a user interface for using functions of the camera in a portion of a second area of the display,
   wherein the display is divided into the first area and the second area based on a position at which the display is bent, wherein the first area and the second area face each other when the display device is bent.

2. The display device of claim 1, wherein the control unit is further configured to display the user interface comprising camera related menus in the second area that is outside of the first area, using the display.

3. The display device of claim 1, wherein the control unit is further configured to determine the portion of the first area based on a ratio of a horizontal length of the preview image to a vertical length thereof.

4. The display device of claim 1, wherein the control unit is further configured to generate a non-processed image based on the captured image, recognize an object in the non-processed image, and to determine a region including the recognized object in the non-processed image as the preview image.

5. The display device of claim 4, wherein the object is a face of a user, which is included in the non-processed image.

6. The display device of claim 1, wherein the control unit is further configured to recognize an eye of a user, which is included in the captured image, and to determine a position of a pupil in the eye of the user and to generate a still image captured at a time point when the position of the pupil satisfies a preset condition.

7. The display device of claim 1, wherein the display comprises a touch screen configured to receive a touch input of a user,
   when the touch input of the user is received on the second area that is outside of the first area, the control unit generates a still image captured at a time point when the touch input is received.

8. The display device of claim 1, further comprising a distance sensor configured to detect a distance between the camera and an eye of a user,
   wherein the control unit is further configured to determine a size of the portion of the first area based on the distance detected by the distance sensor.

9. The display device of claim 1,
   wherein the control unit is further configured to determine a smallest recognizable size based on a display size of the display,
   wherein a preview location of the portion of the first area in which the preview image is to be displayed is determined by the control unit based on a location at which the camera is disposed on the display device, and
   wherein a preview size of the portion of the first area is set to the determined smallest recognizable size.

10. A method of operating a display device, the method comprising:
    based on detecting a bending motion of the display device, controlling a camera to operate and displaying a preview image for capturing an image by operating the camera in a portion of a first area of a display, and
    based on detecting a bending motion of the display device, displaying a user interface for using functions of the camera in a portion of a second area of the display,
    wherein the display is divided into the first area and the second area based on a position at which the display is bent, wherein the first area and the second area face each other when the display device is bent.

11. The method of claim 10, wherein the displaying comprises displaying the user interface comprising camera related menus in the second area that is outside of the first area, using the display.

12. The method of claim 10, wherein the displaying comprises determining the portion of the first area based on a ratio of a horizontal length of the preview image to a vertical length thereof.

13. The method of claim 10, further comprising generating the preview image by:
    generating a non-processed image based on an image signal from the camera;
    recognizing an object by performing image recognition in the non-processed image; and
    determining a region including the recognized object in the non-processed image as the preview image.

14. The method of claim 13, wherein the object is a face of a user, which is included in the non-processed image.

15. The method of claim 10, further comprising:
    recognizing an eye of a user, which is included in the captured image, and determining a position of a pupil in an eye of a user; and
    generating a still image captured at a time point when the position of the pupil satisfies a preset condition.

16. The method of claim 10, wherein the method further comprises:
    receiving a touch input of a user on the second area that is outside of the first area; and
    generating a still image captured at a time point when the touch input is received.

17. The method of claim 10, further comprising detecting a distance between the camera and an eye of a user,
    wherein the displaying comprises determining a size of the portion of the first area based on the distance detected by a distance sensor.

18. The method of claim 10, further comprising determining a smallest recognizable size based on a display size of the display,
  wherein a preview location of the portion of the first area in which the preview image is to be displayed is determined based on a location at which the camera is disposed on the display device, and
  wherein a preview size of the portion of the first area is set to the determined smallest recognizable size.

19. The method of claim 18, further comprising:
  determining the preview size of the portion of the first area based on an eye size detected from the preview image and a pre-stored minimum eye size according to a distance of a user from the display device and a resolution of a sensor of the camera.

20. A non-transitory computer-readable recording medium having recorded thereon a computer-readable program for performing the method of claim 10.

21. The display device of claim 1, wherein the first area is divided into a third area and a fourth area, and wherein the preview image is only displayed in the third area, among the third area and the fourth area.

22. The method of claim 10, wherein the first area is divided into a third area and a fourth area, and wherein the preview image is only displayed in the third area, among the third area and the fourth area.

23. The display device of claim 21, wherein the third area and the fourth area cover the entire portion of the first area, and the camera is closer to the third area than the fourth area.

24. The method of claim 22, wherein the third area and the fourth area cover the entire portion of the first area, and the camera is closer to the third area than the fourth area.

* * * * *